US012446730B2

(12) United States Patent
Martin et al.

(10) Patent No.: US 12,446,730 B2
(45) Date of Patent: *Oct. 21, 2025

(54) GRILL SYSTEM WITH SMOKE ASSEMBLY

(71) Applicant: SharkNinja Operating LLC, Needham, MA (US)

(72) Inventors: Christopher T. Martin, North Attleboro, MA (US); Christopher Smith, Newton, MA (US); Blake Hishmeh, Cambridge, MA (US); Nicholas Chow, Boston, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,237

(22) Filed: Apr. 29, 2022

(65) Prior Publication Data

US 2023/0309745 A1    Oct. 5, 2023

Related U.S. Application Data

(60) Provisional application No. 63/325,129, filed on Mar. 29, 2022.

(51) Int. Cl.
*A47J 37/07*    (2006.01)
*A23B 4/056*    (2006.01)

(52) U.S. Cl.
CPC ........... *A47J 37/0786* (2013.01); *A23B 4/056* (2013.01); *A47J 37/0704* (2013.01)

(58) Field of Classification Search
CPC .... A47J 37/0786; A47J 37/0754; A47J 37/06; A47J 36/06; A47J 37/07; A47J 37/0704;
(Continued)

(56) References Cited

U.S. PATENT DOCUMENTS 3,665,840 A    5/1972   Horany
4,700,618 A *  10/1987  Cox, Jr. ................. A23B 4/052
                                                99/481

(Continued)

FOREIGN PATENT DOCUMENTS

AU    2009238211 B2    12/2014
AU    2014208185 B2    8/2015
(Continued)

OTHER PUBLICATIONS

WO 2018198867 A1 (Year: 2018).*
(Continued)

*Primary Examiner* — Vy T Nguyen
(74) *Attorney, Agent, or Firm* — Mintz, Levin, Cohn, Ferris, Glovsky and Popeo, P.C.

(57) ABSTRACT

Cooking devices, cooking systems, and smoke assemblies for use therewith are provided. In one embodiment, a cooking system is provided and includes a housing and a smoke assembly. The housing can have a lower base portion and an upper lid portion that together define a hollow cooking chamber. The smoke assembly can be coupled to the upper lid portion, and can be in fluid communication with the hollow cooking chamber. The smoke assembly can generate smoke during cooking operations in order to impart smoke flavor onto a food product disposed within the hollow cooking chamber.

15 Claims, 18 Drawing Sheets

(58) Field of Classification Search
CPC ........ A47J 36/00; A47J 37/00; A47J 37/0623;
A47J 37/0641; A47J 27/62; A47J
37/0676; F24B 3/00; A23B 4/052; A23B
4/0523; H05B 6/80
USPC ......... 99/339, 341, 355, 357, 348, 367, 467,
99/481, 507, 482, 445, 340, 449, 523;
426/523; 126/286
See application file for complete search history.

(56) References Cited

U.S. PATENT DOCUMENTS

| | | |
|---|---|---|
| 4,865,219 A | 9/1989 | Logan et al. |
| 6,810,792 B1 | 11/2004 | Knight |
| 6,868,777 B1 | 3/2005 | Higgins et al. |
| 6,941,857 B2 | 9/2005 | Mclemore |
| 7,263,987 B2 | 9/2007 | Sung et al. |
| 7,412,922 B2 | 8/2008 | Mclemore |
| 7,426,885 B2 | 9/2008 | Mclemore et al. |
| 7,703,389 B2 | 4/2010 | Mclemore et al. |
| D616,243 S | 5/2010 | Mclemore et al. |
| 7,757,604 B2 | 7/2010 | Gonzalez |
| 7,832,330 B1 | 11/2010 | Thompson |
| 7,981,459 B2 | 7/2011 | Mclemore |
| 8,042,459 B2 | 10/2011 | Wu |
| 8,109,263 B2 | 2/2012 | Pliml |
| 8,304,696 B2 | 11/2012 | Knight |
| 8,481,894 B2 | 7/2013 | Robin et al. |
| 8,669,500 B2 | 3/2014 | Hensel et al. |
| 8,748,783 B2 | 6/2014 | Hensel et al. |
| 8,878,106 B2 | 11/2014 | Hensel et al. |
| 8,931,400 B1 | 1/2015 | Allen |
| 9,022,018 B2 | 5/2015 | Hensel |
| 9,226,615 B2 | 1/2016 | Hofmann |
| 9,375,021 B2 | 6/2016 | Raghavan et al. |
| 9,441,838 B2 | 9/2016 | Baker |
| 9,486,000 B2 | 11/2016 | Kaderli |
| 9,603,372 B2 | 3/2017 | Bader |
| 9,631,820 B2 | 4/2017 | Hensel |
| 9,788,688 B1 | 10/2017 | Ficarra |
| 9,799,199 B2 | 10/2017 | Allen |
| 9,844,297 B2 | 12/2017 | Volatier et al. |
| 9,883,770 B2 | 2/2018 | Hunt et al. |
| 9,930,897 B2 | 4/2018 | Blue et al. |
| 10,021,887 B2 | 7/2018 | Mclemore et al. |
| 10,021,888 B2 | 7/2018 | Mclamb |
| 10,045,546 B2 | 8/2018 | Giebel et al. |
| 10,067,004 B1 | 9/2018 | Allen |
| 10,149,573 B2 | 12/2018 | Volatier et al. |
| 10,158,720 B2 | 12/2018 | Colston |
| 10,218,833 B2 | 2/2019 | Colston |
| 10,271,559 B2 | 4/2019 | Nitta et al. |
| 10,292,531 B1 | 5/2019 | Hancock et al. |
| 10,327,584 B2 | 6/2019 | Shingler et al. |
| 10,327,588 B2 | 6/2019 | Dahle et al. |
| 10,327,589 B1 | 6/2019 | Dahle et al. |
| 10,339,783 B2 | 7/2019 | Allen, Sr. |
| 10,383,477 B2 | 8/2019 | Payen et al. |
| 10,388,141 B2 | 8/2019 | Allen, Sr. |
| 10,395,506 B2 | 8/2019 | Allen, Sr. |
| 10,426,176 B2 | 10/2019 | Dixon et al. |
| 10,455,022 B2 | 10/2019 | Colston |
| 10,455,979 B2 | 10/2019 | Colston et al. |
| 10,478,016 B2 | 11/2019 | Mclemore et al. |
| 10,491,738 B2 | 11/2019 | Colston |
| 10,517,427 B2 | 12/2019 | Hackley |
| 10,520,202 B2 | 12/2019 | Delrue et al. |
| 10,524,312 B2 | 12/2019 | Knappenberger et al. |
| 10,537,199 B2 | 1/2020 | Knappenberger et al. |
| 10,551,893 B2 | 2/2020 | Knappenberger et al. |
| 10,559,186 B2 | 2/2020 | Allen, Sr. |
| 10,588,457 B2 | 3/2020 | Hingorani |
| 10,588,461 B2 | 3/2020 | Dahle |
| 10,624,358 B2 | 4/2020 | Akinbobola et al. |
| 10,641,495 B2 | 5/2020 | Hamm |
| 10,652,386 B2 | 5/2020 | Colston |
| 10,660,473 B2 | 5/2020 | Dahle et al. |
| 10,674,866 B2 | 6/2020 | Colston |
| 10,682,010 B2 | 6/2020 | Hoare et al. |
| 10,694,892 B2 | 6/2020 | Colston |
| 10,701,199 B2 | 6/2020 | Colston |
| 10,708,409 B2 | 7/2020 | Colston |
| 10,718,671 B2 | 7/2020 | Allen |
| 10,735,523 B2 | 8/2020 | Colston |
| 10,735,575 B2 | 8/2020 | Colston |
| 10,757,244 B2 | 8/2020 | Colston |
| 10,764,423 B2 | 9/2020 | Colston |
| 10,772,467 B2 | 9/2020 | Dahle |
| 10,785,363 B2 | 9/2020 | Colston |
| 10,789,827 B2 | 9/2020 | Allen, Sr. |
| 10,791,208 B2 | 9/2020 | Colston |
| 10,806,301 B2 | 10/2020 | Hancock et al. |
| 10,888,193 B2 | 1/2021 | Dahle et al. |
| 10,905,281 B2 | 2/2021 | Delrue et al. |
| 10,912,413 B2 | 2/2021 | Walters et al. |
| 10,951,751 B2 | 3/2021 | Colston |
| 10,952,564 B2 | 3/2021 | Dahle et al. |
| 10,959,572 B2 | 3/2021 | Dahle et al. |
| 10,986,960 B2 | 4/2021 | Colston |
| 10,995,964 B2 | 5/2021 | Dahle |
| 11,006,646 B2 | 5/2021 | Garces et al. |
| 11,045,047 B2 * | 6/2021 | Popeil .................... F24C 15/08 |
| 11,064,837 B2 | 7/2021 | Yang et al. |
| 11,076,608 B2 | 8/2021 | Hall et al. |
| 11,109,600 B2 | 9/2021 | Jackson |
| 11,125,438 B1 | 9/2021 | Pruitt et al. |
| 11,129,244 B2 | 9/2021 | Hoare et al. |
| 11,132,885 B2 | 9/2021 | Allen, Sr. |
| 11,162,684 B2 | 11/2021 | Colston et al. |
| 11,172,688 B2 | 11/2021 | Powell et al. |
| 11,181,276 B2 | 11/2021 | Colston et al. |
| 11,181,277 B2 | 11/2021 | Donnelly et al. |
| 11,190,015 B2 | 11/2021 | Marsh-croft et al. |
| 11,197,579 B2 | 12/2021 | Volatier |
| 11,202,454 B2 | 12/2021 | Leibell |
| 11,206,307 B2 | 12/2021 | Colston |
| 11,206,948 B2 | 12/2021 | Measom et al. |
| 11,248,798 B2 | 2/2022 | Donnelly et al. |
| 11,248,799 B2 | 2/2022 | Donnelly et al. |
| 11,248,800 B2 | 2/2022 | Donnelly et al. |
| 11,248,801 B2 | 2/2022 | Donnelly et al. |
| 11,250,686 B2 | 2/2022 | Allen, Sr. |
| 11,322,012 B2 | 5/2022 | Allen, Sr. |
| 11,324,357 B2 | 5/2022 | Colston |
| 11,359,817 B2 | 6/2022 | Donnelly et al. |
| 11,371,712 B2 | 6/2022 | Donnelly et al. |
| 11,435,074 B2 | 9/2022 | Rahmani et al. |
| 11,454,677 B2 | 9/2022 | Knappenberger et al. |
| 11,478,107 B2 | 10/2022 | Volatier |
| 11,497,349 B2 | 11/2022 | Meadows et al. |
| 11,598,532 B2 | 3/2023 | Reid et al. |
| 11,622,007 B2 | 4/2023 | Colston |
| 11,622,008 B2 | 4/2023 | Colston |
| 11,622,420 B2 | 4/2023 | Knappenberger et al. |
| 11,684,212 B2 | 6/2023 | Dahle et al. |
| 2005/0204934 A1 * | 9/2005 | Robertson ................ A23L 5/15 |
| | | 99/482 |
| 2009/0078127 A1 | 3/2009 | Mclemore et al. |
| 2009/0087534 A1 | 4/2009 | Mclemore |
| 2012/0009317 A1 | 1/2012 | Mclemore |
| 2012/0012096 A1 * | 1/2012 | Cusack ............... A47J 37/0786 |
| | | 432/3 |
| 2014/0299005 A1 * | 10/2014 | Vinett .................... A23B 4/052 |
| | | 99/482 |
| 2014/0360387 A1 * | 12/2014 | Bogdon ............... A23B 4/0523 |
| | | 99/476 |
| 2017/0360255 A1 * | 12/2017 | Karau ................. A47J 37/0754 |
| 2018/0028018 A1 | 2/2018 | Barnett et al. |
| 2018/0168397 A1 | 6/2018 | Colston |
| 2018/0279633 A1 | 10/2018 | Qiu |
| 2018/0296031 A1 | 10/2018 | Terrell, Jr. et al. |
| 2018/0325314 A1 | 11/2018 | Walters |
| 2018/0360058 A1 | 12/2018 | Giebel et al. |
| 2018/0360059 A1 | 12/2018 | Giebel et al. |

(56) References Cited

U.S. PATENT DOCUMENTS

| | | |
|---|---|---|
| 2019/0254476 A1 | 8/2019 | Anthony et al. |
| 2019/0282031 A1 | 9/2019 | Feng |
| 2019/0289864 A1* | 9/2019 | Swayne ............... A23B 4/052 |
| 2019/0290062 A1 | 9/2019 | Prieto et al. |
| 2019/0290064 A1 | 9/2019 | Colston et al. |
| 2019/0290069 A1 | 9/2019 | Colston et al. |
| 2019/0320669 A1* | 10/2019 | Powell ............... A47J 37/0629 |
| 2019/0335773 A1* | 11/2019 | Garces ...................... A23L 5/17 |
| 2019/0365152 A1 | 12/2019 | Dahle et al. |
| 2020/0053842 A1* | 2/2020 | Jeon .................... H05B 6/6473 |
| 2020/0054032 A1* | 2/2020 | Garces ............... A23B 4/0523 |
| 2020/0093145 A1 | 3/2020 | Powell et al. |
| 2020/0100615 A1 | 4/2020 | Knappenberger et al. |
| 2020/0116349 A1 | 4/2020 | Rahmani et al. |
| 2020/0201414 A1 | 6/2020 | Knappenberger et al. |
| 2020/0202027 A1 | 6/2020 | Chan et al. |
| 2020/0214501 A1 | 7/2020 | Gafford et al. |
| 2020/0214503 A1 | 7/2020 | Altenritter |
| 2020/0237139 A1 | 7/2020 | Colston |
| 2020/0237146 A1 | 7/2020 | Donnelly et al. |
| 2020/0237148 A1 | 7/2020 | Donnelly et al. |
| 2020/0253422 A1* | 8/2020 | Suchevits ........... A47J 37/0786 |
| 2020/0275804 A1 | 9/2020 | Dahle |
| 2020/0315389 A1* | 10/2020 | Stewart ................. A47J 27/086 |
| 2020/0358893 A1 | 11/2020 | Colston |
| 2020/0405085 A1 | 12/2020 | Dos Santos et al. |
| 2020/0405086 A1 | 12/2020 | Dos Santos et al. |
| 2021/0007550 A1 | 1/2021 | Puertas et al. |
| 2021/0052108 A1 | 2/2021 | Dahle |
| 2021/0161151 A1 | 6/2021 | Thorogood et al. |
| 2021/0169269 A1 | 6/2021 | Meadows et al. |
| 2021/0196078 A1 | 7/2021 | Colston et al. |
| 2021/0196079 A1 | 7/2021 | Dahle et al. |
| 2021/0228020 A1 | 7/2021 | Hanks et al. |
| 2021/0235927 A1 | 8/2021 | Colston |
| 2021/0244233 A1 | 8/2021 | Bush et al. |
| 2021/0251423 A1 | 8/2021 | Dahle et al. |
| 2021/0267413 A1 | 9/2021 | Roberts et al. |
| 2021/0282590 A1 | 9/2021 | Dahle et al. |
| 2021/0293413 A1 | 9/2021 | Donnelly et al. |
| 2021/0302027 A1 | 9/2021 | Dahle |
| 2021/0310665 A1 | 10/2021 | Lam |
| 2021/0315416 A1 | 10/2021 | Fullmer et al. |
| 2021/0352923 A1 | 11/2021 | Li et al. |
| 2021/0369051 A1 | 12/2021 | Thorogood et al. |
| 2021/0369052 A1 | 12/2021 | Fullmer et al. |
| 2022/0007689 A1 | 1/2022 | Baldwin |
| 2022/0031107 A1 | 2/2022 | Dixon et al. |
| 2022/0046936 A1 | 2/2022 | Neuman |
| 2022/0046937 A1 | 2/2022 | Simon et al. |
| 2022/0061589 A1 | 3/2022 | Dotson et al. |
| 2022/0071444 A1 | 3/2022 | Springer |
| 2022/0086232 A1 | 3/2022 | Colston |
| 2022/0087475 A1 | 3/2022 | Terrell et al. |
| 2022/0132874 A1 | 5/2022 | Dean |
| 2022/0160174 A1 | 5/2022 | Matz |
| 2022/0223025 A1 | 7/2022 | Allen, Sr. |
| 2022/0232116 A1 | 7/2022 | Colston |
| 2022/0232117 A1 | 7/2022 | Colston |
| 2022/0257051 A1 | 8/2022 | Colston |
| 2022/0279969 A1* | 9/2022 | Vandyke ............. A47J 37/0786 |
| 2022/0322874 A1 | 10/2022 | Marsh-croft et al. |
| 2022/0412549 A1 | 12/2022 | Rahmani et al. |
| 2023/0038171 A1 | 2/2023 | Stidston et al. |

FOREIGN PATENT DOCUMENTS

| | | |
|---|---|---|
| AU | 2015255207 B2 | 9/2016 |
| AU | 2016297715 A1 | 3/2017 |
| AU | 2016216635 A1 | 5/2017 |
| AU | 2016276039 A1 | 12/2017 |
| AU | 2016276160 A1 | 1/2018 |
| AU | 2018251790 A1 | 10/2019 |
| AU | 2019202070 A1 | 10/2019 |
| AU | 2019202071 A1 | 10/2019 |
| AU | 2019202074 A1 | 10/2019 |
| AU | 2019202075 A1 | 10/2019 |
| AU | 2019280574 B2 | 1/2021 |
| AU | 2019342959 A1 | 4/2021 |
| AU | 2021202627 A1 | 5/2021 |
| AU | 2019359493 A1 | 6/2021 |
| AU | 2019364217 A1 | 6/2021 |
| AU | 2020286227 A1 | 6/2021 |
| AU | 2020319805 A1 | 2/2022 |
| AU | 2020347101 A1 | 4/2022 |
| AU | 2019423840 B2 | 5/2022 |
| AU | 2019424802 B2 | 7/2022 |
| AU | 2019424191 B2 | 8/2022 |
| AU | 2019424192 B2 | 8/2022 |
| AU | 2019424803 B2 | 8/2022 |
| AU | 2019423839 B2 | 9/2022 |
| AU | 2019424099 B2 | 9/2022 |
| AU | 2019424100 B2 | 9/2022 |
| AU | 2019424805 B2 | 10/2022 |
| AU | 2022256109 A1 | 11/2022 |
| AU | 2019342959 B2 | 4/2023 |
| AU | 2021339461 A8 | 4/2023 |
| CA | 2569972 C | 7/2012 |
| CA | 2535012 C | 6/2015 |
| CA | 2721322 C | 10/2016 |
| CA | 2988570 A1 | 12/2016 |
| CA | 2995405 A1 | 12/2016 |
| CA | 2941277 A1 | 4/2017 |
| CA | 2962832 A1 | 4/2017 |
| CA | 2969476 A1 | 4/2017 |
| CA | 3057846 A1 | 10/2018 |
| CA | 3099391 A1 | 11/2018 |
| CA | 3129669 A1 | 11/2018 |
| CA | 2911721 C | 1/2019 |
| CA | 3037207 A1 | 3/2019 |
| CA | 3036777 A1 | 9/2019 |
| CA | 3037934 A1 | 9/2019 |
| CA | 3037936 A1 | 9/2019 |
| CA | 3037937 A1 | 9/2019 |
| CA | 3038088 A1 | 9/2019 |
| CA | 3098877 A1 | 11/2019 |
| CA | 3127374 A1 | 12/2019 |
| CA | 3111352 A1 | 3/2020 |
| CA | 3115989 A1 | 4/2020 |
| CA | 3066299 A1 | 7/2020 |
| CA | 3122495 A1 | 7/2020 |
| CA | 3122497 A1 | 7/2020 |
| CA | 3122512 A1 | 7/2020 |
| CA | 3122516 A1 | 7/2020 |
| CA | 3122519 A1 | 7/2020 |
| CA | 3122521 A1 | 7/2020 |
| CA | 3122523 A1 | 7/2020 |
| CA | 3122525 A1 | 7/2020 |
| CA | 3122657 A1 | 7/2020 |
| CA | 3136333 A1 | 11/2020 |
| CA | 3000527 C | 12/2020 |
| CA | 2971815 C | 1/2021 |
| CA | 3159171 A1 | 7/2021 |
| CA | 3112101 A1 | 9/2021 |
| CA | 3000542 C | 11/2021 |
| CA | 3101997 C | 11/2021 |
| CA | 2971814 C | 12/2021 |
| CA | 3066299 C | 4/2022 |
| CA | 3094309 C | 8/2022 |
| CA | 3102207 C | 3/2023 |
| CN | 1287717 C | 12/2006 |
| CN | 101057751 A | 10/2007 |
| CN | 202445881 U | 9/2012 |
| CN | 102007345 B | 1/2013 |
| CN | 203328547 U | 12/2013 |
| CN | 101119664 B | 7/2014 |
| CN | 203852233 U | 10/2014 |
| CN | 105167640 A | 12/2015 |
| CN | 101953645 B | 1/2016 |
| CN | 105451567 A | 3/2016 |
| CN | 105662170 A | 6/2016 |
| CN | 205391021 U | 7/2016 |
| CN | 103917145 B | 11/2016 |
| CN | 106163676 A | 11/2016 |

(56) References Cited

FOREIGN PATENT DOCUMENTS

| | | |
|---|---|---|
| CN | 206053603 U | 3/2017 |
| CN | 206062956 U | 4/2017 |
| CN | 106963248 A | 7/2017 |
| CN | 206295269 U | 7/2017 |
| CN | 105167640 B | 8/2017 |
| CN | 104797177 B | 10/2017 |
| CN | 107251507 A | 10/2017 |
| CN | 107347967 A | 11/2017 |
| CN | 104885560 B | 1/2018 |
| CN | 107529920 A | 1/2018 |
| CN | 105662170 B | 2/2018 |
| CN | 206979387 U | 2/2018 |
| CN | 107920679 A | 4/2018 |
| CN | 108093620 A | 5/2018 |
| CN | 108185836 A | 6/2018 |
| CN | 108433563 A | 8/2018 |
| CN | 106963248 B | 1/2019 |
| CN | 208510814 U | 2/2019 |
| CN | 208524651 U | 2/2019 |
| CN | 209300859 U | 8/2019 |
| CN | 209377377 U | 9/2019 |
| CN | 110353518 A | 10/2019 |
| CN | 110353519 A | 10/2019 |
| CN | 110353520 A | 10/2019 |
| CN | 110353525 A | 10/2019 |
| CN | 209489913 U | 10/2019 |
| CN | 209826361 U | 12/2019 |
| CN | 107565511 B | 1/2020 |
| CN | 110958837 A | 4/2020 |
| CN | 107562115 B | 5/2020 |
| CN | 111493681 A | 8/2020 |
| CN | 211212757 U | 8/2020 |
| CN | 211372488 U | 8/2020 |
| CN | 108808621 B | 9/2020 |
| CN | 211795985 U | 10/2020 |
| CN | 112103909 A | 12/2020 |
| CN | 112261894 A | 1/2021 |
| CN | 113163983 A | 7/2021 |
| CN | 113208460 A | 8/2021 |
| CN | 113226130 A | 8/2021 |
| CN | 113226131 A | 8/2021 |
| CN | 113226132 A | 8/2021 |
| CN | 113226133 A | 8/2021 |
| CN | 113227651 A | 8/2021 |
| CN | 113260289 A | 8/2021 |
| CN | 113260290 A | 8/2021 |
| CN | 113260291 A | 8/2021 |
| CN | 113272862 A | 8/2021 |
| CN | 113316409 A | 8/2021 |
| CN | 113453598 A | 9/2021 |
| CN | 106998964 B | 10/2021 |
| CN | 114041028 A | 2/2022 |
| CN | 215738499 U | 2/2022 |
| CN | 110880738 B | 3/2022 |
| CN | 114423292 A | 4/2022 |
| CN | 216221239 U | 4/2022 |
| CN | 108803767 B | 7/2022 |
| CN | 111522388 B | 7/2022 |
| CN | 114901109 A | 8/2022 |
| CN | 110996668 B | 9/2022 |
| DE | 212016000022 U1 | 8/2017 |
| DE | 212016000157 U1 | 3/2018 |
| DE | 102019107552 A8 | 3/2020 |
| EP | 1400195 B1 | 2/2005 |
| EP | 1403587 B1 | 5/2006 |
| EP | 1517093 B1 | 7/2006 |
| EP | 1466546 B1 | 11/2006 |
| EP | 1514502 B1 | 12/2006 |
| EP | 1800579 B1 | 12/2008 |
| EP | 1795096 B1 | 6/2009 |
| EP | 2304322 A4 | 4/2014 |
| EP | 2605690 B1 | 11/2014 |
| EP | 2433530 B1 | 12/2014 |
| EP | 2304322 B1 | 5/2017 |
| EP | 2915411 B1 | 12/2017 |
| EP | 3273558 A3 | 4/2018 |
| EP | 3366023 A1 | 8/2018 |
| EP | 2739191 B1 | 9/2018 |
| EP | 3399836 A1 | 11/2018 |
| EP | 3366023 A4 | 4/2019 |
| EP | 3473106 A1 | 4/2019 |
| EP | 3364838 A4 | 5/2019 |
| EP | 3473106 B1 | 5/2020 |
| EP | 3677157 A1 | 7/2020 |
| EP | 3375335 B1 | 8/2020 |
| EP | 3648608 A4 | 3/2021 |
| EP | 3644746 A4 | 6/2021 |
| EP | 3865031 A1 | 8/2021 |
| EP | 3399613 B1 | 9/2021 |
| EP | 3870008 A1 | 9/2021 |
| EP | 3366015 B1 | 11/2021 |
| EP | 3913878 A1 | 11/2021 |
| EP | 3944444 A1 | 1/2022 |
| EP | 3450855 B1 | 6/2022 |
| EP | 4027795 A1 | 7/2022 |
| EP | 3294039 B1 | 8/2022 |
| EP | 3870008 A4 | 8/2022 |
| EP | 4099798 A3 | 2/2023 |
| FR | 2893832 B1 | 2/2012 |
| FR | 3079600 B1 | 9/2020 |
| FR | 3117325 A1 | 6/2022 |
| GB | 201720729 | 1/2018 |
| GB | 2555054 A | 4/2018 |
| GB | 2558532 A | 7/2018 |
| GB | 201904197 | 5/2019 |
| GB | 201904199 | 5/2019 |
| GB | 201904200 | 5/2019 |
| GB | 2572489 A | 10/2019 |
| GB | 2572491 A | 10/2019 |
| GB | 2572492 A | 10/2019 |
| GB | 2572261 B | 6/2020 |
| GB | 202018759 | 1/2021 |
| GB | 2558089 B | 3/2022 |
| GB | 2557057 B | 7/2022 |
| GB | 2600024 B | 7/2022 |
| GB | 2601909 B | 8/2022 |
| JP | 2018526036 A | 9/2018 |
| KR | 20130031610 A | 3/2013 |
| KR | 20180039541 A | 4/2018 |
| KR | 20180067383 A | 6/2018 |
| WO | 2005016091 A1 | 2/2005 |
| WO | 2015175366 A1 | 11/2015 |
| WO | 2016093481 A1 | 6/2016 |
| WO | 2016200650 A1 | 12/2016 |
| WO | 2016200678 A1 | 12/2016 |
| WO | 2018191372 A1 | 10/2018 |
| WO | 2018208919 A1 | 11/2018 |
| WO | 2019204723 A1 | 10/2019 |
| WO | 2019236423 A1 | 12/2019 |
| WO | 2020060687 A1 | 3/2020 |
| WO | 2020077366 A1 | 4/2020 |
| WO | 2020154014 A1 | 7/2020 |
| WO | 2020154015 A1 | 7/2020 |
| WO | 2020154016 A1 | 7/2020 |
| WO | 2020154017 A1 | 7/2020 |
| WO | 2020154018 A1 | 7/2020 |
| WO | 2020154019 A1 | 7/2020 |
| WO | 2020154020 A1 | 7/2020 |
| WO | 2020154021 A1 | 7/2020 |
| WO | 2020154022 A1 | 7/2020 |
| WO | 2021020974 A1 | 2/2021 |
| WO | 2021138455 A4 | 9/2021 |
| WO | 2022051800 A1 | 3/2022 |
| WO | 2023272336 A1 | 1/2023 |
| WO | 2023004464 A1 | 2/2023 |

OTHER PUBLICATIONS

European Search Report Received for European Patent Application No. 22183967.3, mailed on Dec. 5, 2022, 4 pages.

(56) References Cited

OTHER PUBLICATIONS

International Search Report and Written Opinion Received for PCT Patent Application No. PCT/US2022/073258, mailed on Dec. 5, 2022, 15 pages.

* cited by examiner

GRILL SYSTEM WITH SMOKE ASSEMBLY

CROSS-REFERENCE TO RELATED APPLICATIONS

This application claims priority to U.S. Provisional Patent Application No. 63/325,129 filed Mar. 29, 2022 and entitled "GRILL SYSTEM WITH SMOKE ASSEMBLY," the entire contents of which are hereby expressly incorporated by reference herein.

FIELD

A grill system including a smoke assembly, and methods for cooking, are provided.

BACKGROUND

Smoke can be used in a variety of cooking devices and with a variety of cooking operations to impart flavor. As an example, grills and grilling devices can come equipped with smoking capabilities, or the means with which to impart smoke flavor into food cooked with these grills and grilling devices. However, electric cooking appliances may only be able to impart limited smoke flavor or no smoke flavor into food cooked therewith. Further, in grilling systems which impart smoke flavor into food, control of the smoke output can be challenging.

SUMMARY

A cooking device, a smoke assembly, and methods of cooking food using a cooking device with a smoke assembly are provided. Related apparatuses and techniques are also described.

In one embodiment, a cooking assembly is provided. The cooking assembly can include a housing having a base defining a hollow cooking chamber, and a lid coupled to the base. At least one heating element can be disposed in the housing that is in thermal communication with the hollow cooking chamber, and a fan can be disposed in the housing and configured to circulate air in the hollow cooking chamber. The cooking assembly can also include a smoke assembly coupled to the housing. The smoke assembly can include a fuel box defining an interior chamber in fluid communication with the hollow cooking chamber.

One or more of the following features can be included in any feasible combination. For example, the cooking assembly can further include a grill surface disposed in the housing, and a second heating element disposed beneath the grill surface.

In another example, the cooking assembly can include a baffle disposed in the lid. The baffle can be in fluid communication with the hollow cooking chamber and the interior chamber, and the baffle can be configured to allow smoke to be drawn therethrough from the interior chamber into the hollow cooking chamber. The cooking assembly can also include an exhaust port on the housing. In certain aspects, the exhaust port and the baffle can be configured to allow fluid flow therethrough at substantially the same rate.

In another embodiment, the smoke assembly can include an ash catcher disposed below the fuel box and configured to retain ash. The ash catcher can be separated from the fuel box by a screen.

The smoke assembly can also include a temperature sensor configured to measure an internal temperature of the fuel box. In certain aspects, the igniter can be configured to attempt ignition if the temperature sensor measures an internal temperature below a temperature threshold. The igniter can be disposed at various locations, such as above the fuel box such that it is configured to ignite fuel in a top-down manner.

In another embodiment, a cooking assembly is provided and includes a cooking device defining an internal cooking chamber, and a smoke assembly coupled to the cooking device and fluidly coupled to the internal cooking chamber. The smoke assembly can include a fuel box having at least one sidewall containing a plurality of apertures. The cooking assembly can also include an igniter disposed proximate to the at least one sidewall. The igniter can be configured to ignite fuel contained in the fuel box through the at least one sidewall. The cooking assembly can also include a fan disposed in the cooking device and configured to draw smoke generated by the smoke assembly into the internal cooking chamber.

One or more of the follow features can be included in any feasible combination. For example, the smoke assembly can include a temperature sensor configured to measure an internal temperature of the fuel box. The cooking device can also include a controller configured to cause the igniter to attempt ignition if the temperature sensor measures an internal temperature below a temperature threshold.

In other aspects, the cooking assembly can include an ash catcher disposed beneath the fuel box. In another example, the smoke assembly can include a lid coupled to the fuel box. The lid can be biased to a closed position. In another example, the smoke assembly can include a housing fixed to the cooking device, and the fuel box can be removably insertable in the housing.

In another embodiment, a method of operating a cooking device is provided. The method can include receiving an input to begin a cooking operation of a cooking device, and causing an igniter disposed proximate a smoke assembly to ignite a fuel source contained within the smoke assembly. The method can further include causing a fan disposed within the cooking device to rotate to draw in smoke generated by the ignited fuel source, and to circulate the smoke through an internal cooking chamber of the cooking device.

One or more of the following features can be included in any feasible combination. For example, the input can be received by a controller. The controller can determine a first instruction based on the received input and provide the first instruction to cause the igniter to ignite, and the controller can determine a second instruction based on the received input and provide the second instruction to cause the fan to rotate.

In another example, the method can include receiving an input to adjust one of a smoke volume and a smoke duration, and causing a fan speed of the fan to change in response to the input.

In another example, the method can include receiving an internal temperature of the smoke assembly from a temperature probe, and causing the igniter to attempt to ignite the fuel source if the internal temperature is below a temperature threshold. In another example the igniter can attempt to ignite the fuel source for a predetermined duration.

In another example, the cooking operation can cause the fan to draw smoke generated by the ignited fuel source for a partial duration of the cooking operation.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other features will be more readily understood from the following detailed description taken in conjunction with the accompanying drawings, in which.

Figure 1A:
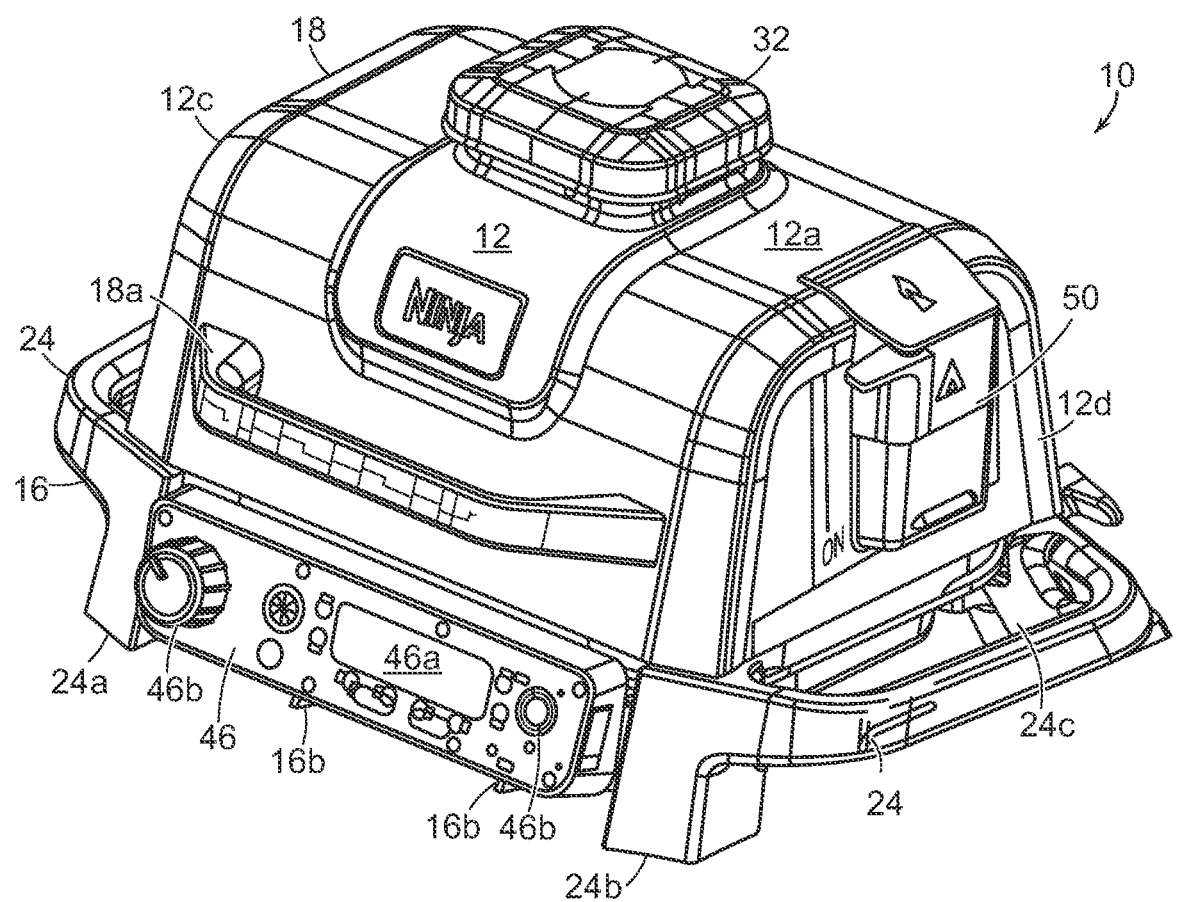
FIG. 1A is a front perspective view of one embodiment of a cooking system having a smoke assembly mounted on an exterior thereof.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

In general, a cooking system is provided that includes a smoke assembly that can be operated in combination with, or in place of, additional cooking modes in order to impart smoke flavor onto a food product placed within a cooking chamber. The cooking system generally includes a housing and a smoke assembly. The housing can include a lower base portion and an upper lid portion that together define a hollow cooking chamber inside the housing. The housing can include a heating element disposed therein, and the upper lid portion can include a fan that is configured to circulate air throughout the hollow cooking chamber. A smoke assembly can be disposed on an exterior surface of the housing, and it can be configured to generate smoke to be imparted onto a food product contained within the hollow cooking chamber. The housing can include an opening for fluidly coupling the smoke assembly to the cooking chamber to allow smoke to be drawn into the cooking chamber. The smoke assembly can have a variety of configurations, but in general it can include a fuel box assembly configured to contain combusting fuel to generate smoke, and an ignition source configured to ignite the fuel contained in the fuel box assembly. In certain aspects, the smoke assembly can also include a temperature sensor to measure an internal temperature of the fuel box assembly, and an ash catcher disposed in a lower region of the fuel box assembly to capture ash created during a combustion process. The fuel box assembly can be removably contained within a smoke assembly housing so that the fuel box assembly can be removed as need for refueling, cleaning, and for other purposes. The smoke assembly can also have a smoke lid to substantially seal off an interior of the smoke assembly in order to limit air flow into the smoke assembly during a combustion process.

The cooking system can also include a controller having a user interface disposed on the housing for receiving instructions configured to cause the cooking system to perform a cooking operation in a variety of cooking modes, including modes using conduction and/or convection, and modes to include the generation of smoke using the smoke assembly. These modes may be operated alone or in one or more combinations to form a complete cooking procedure. One or more settings of the cooking operation, such as cook time, temperature, smoke generation volume, and other settings can be adjusted through inputs on the user interface.

With reference now to FIGS. 1A-1H, an exemplary embodiment of a cooking system 10 is shown. The illustrated cooking system 10 includes a housing 12 having a generally rectangular configuration with top and bottom surfaces 12a, 12b, and four sides, including left, right, front, and back sides 12c, 12d, 12e, 12f The particular shape of the housing 12 can vary and certain surfaces can be rounded or have other variations that alter the appearance of the housing 12. For example, as shown in FIG. 1A, the sides 12c, 12d, 12e, 12f of the housing 12 diverge from the top surface 12a to the bottom surface 12b. Such a configuration can aid in providing stability, since the bottom portion of the housing 12 is larger than the top portion of the housing 12.

Figure 1B:
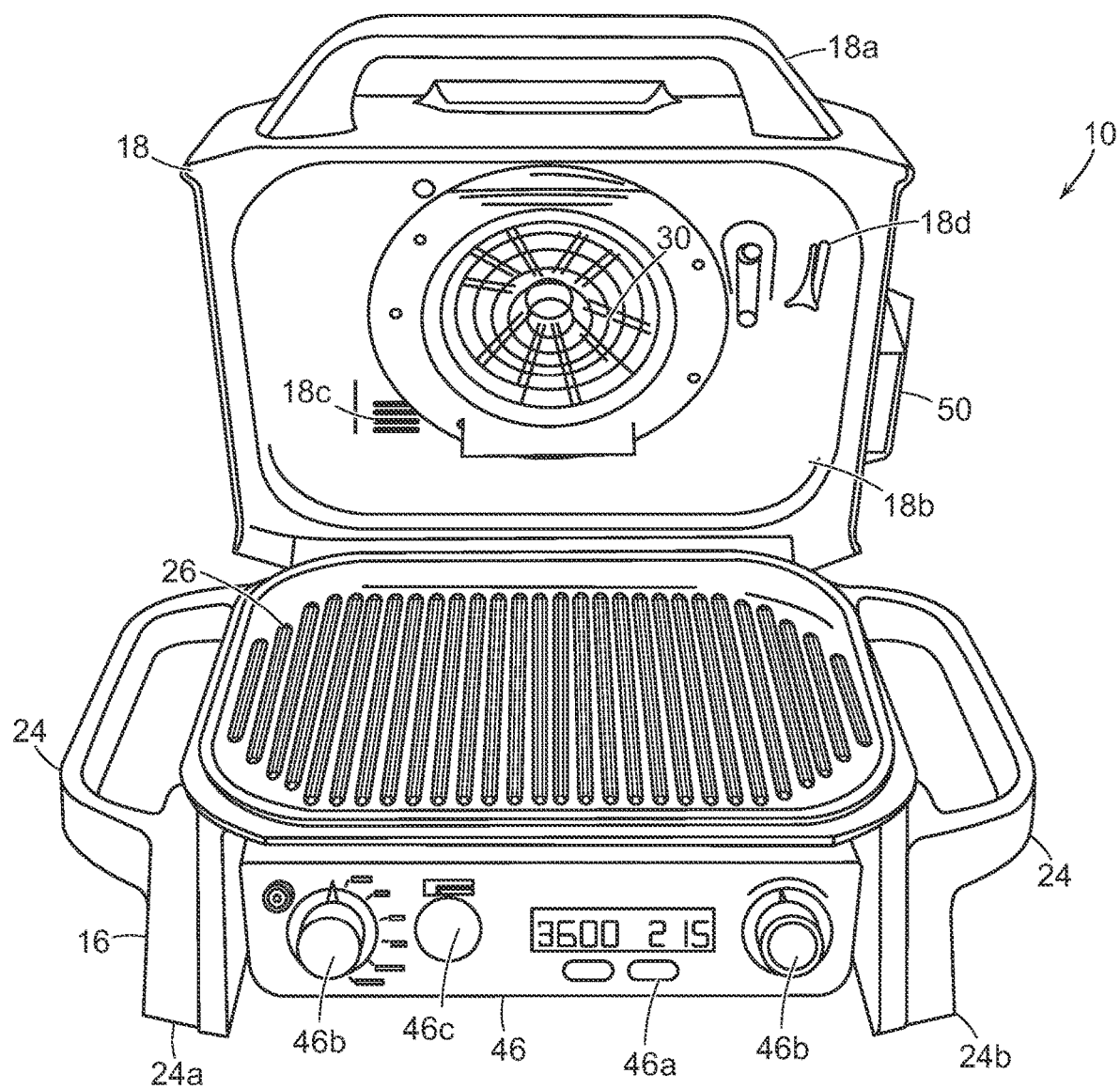
FIG. 1B is a front view of the cooking system of FIG. 1A, having a lid in an open position.
Figure 1C:
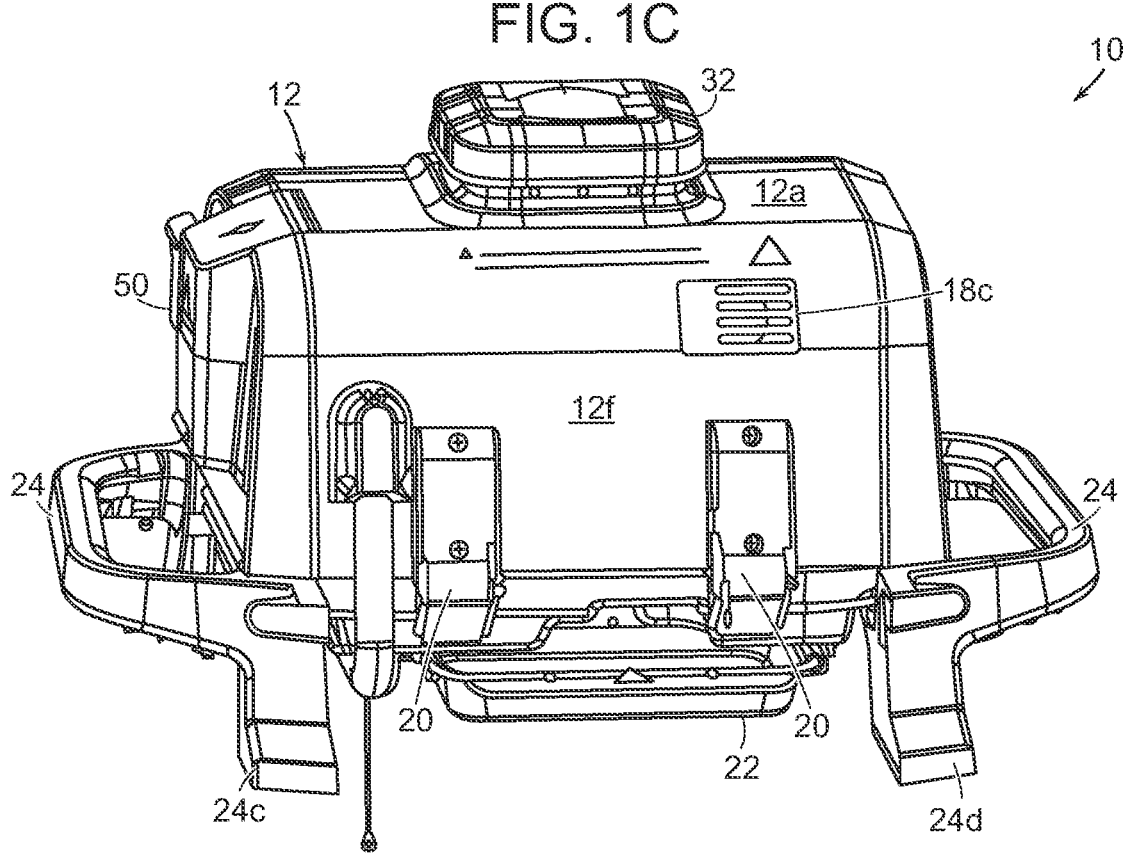
FIG. 1C is a rear perspective view of the cooking system of FIG. 1A.
Figure 1D:
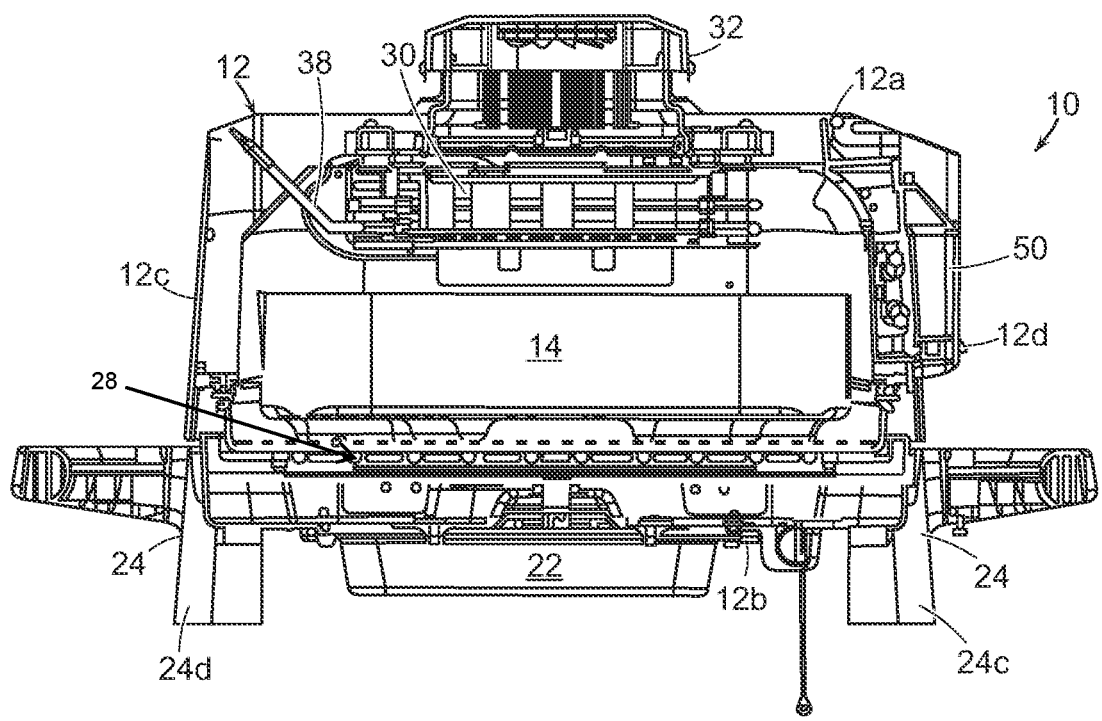
FIG. 1D is cross-sectional view of the cooking system of FIG. 1A.
Figure 1E:
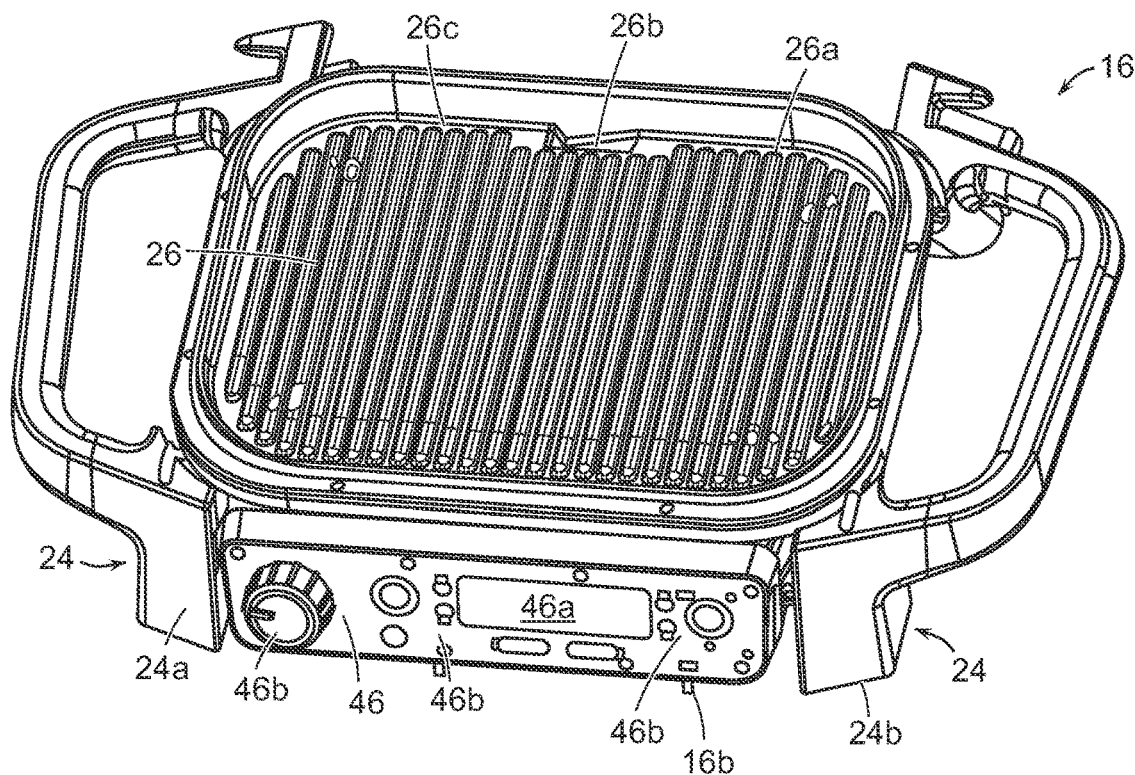
FIG. 1E is a front perspective view of the cooking system of FIG. 1A, having a lid in an open position.

The housing 12 further includes an interior hollow cooking chamber 14 defined within the housing 12, as shown in FIGS. 1B and 1D. The interior hollow cooking chamber 14 can be defined by a lower base portion 16 of the housing 12 and an upper lid portion 18 of the housing 12 The lower base portion 16 can define a substantial portion of the hollow cooking chamber 14, with the upper lid portion 18 being movably coupled to the lower base portion 16 for selectively enclosing the hollow cooking chamber 14.

In the illustrated embodiment, the upper lid portion 18 is coupled to the lower base portion 16 via a rear hinge 20, such that the upper lid portion 18 is configured to move between a closed position wherein the hollow cooking chamber 14 is closed off from an external environment, such as depicted in FIGS. 1A and 1C, and an open position wherein the hollow cooking chamber 14 is open to an external environment, such as depicted in FIG. 1B. The upper lid portion 18 can include a handle 18a mounted on an exterior surface to facilitate opening and closing the upper lid portion 18. In the closed position, as a result of containing the hollow cooking chamber 14, the upper lid portion 18 can contact the lower base portion 16 at a perimeter region thereof where the sides of the lower base portion 16 and the upper lid portion 18 meet. One or both of the perimeter regions can include a gasket or perimeter seal, such as perimeter seal 18b shown on the upper lid portion 18 in FIG. 1B, that is configured to prevent airflow through the perimeter region. The perimeter seal 18b can be made from a heat-resistant material that can withstand temperatures reached by the cooking assembly 10 during cooking operations. Likewise, the housing 12 can be formed from a heat-resistant material such that the housing 12 can support high cooking temperatures.

As further shown in FIGS. 1A-1H, the housing 12 can include additional elements. For example, a support structure 24 having four feet 24a, 24b, 24c, 24d disposed at corners thereof can be formed on or coupled to the bottom surface 12b to aid in stabilization of the cooking system 10. As further shown in FIGS. 1B and 1E-1F, a grill surface 26 can be formed on or disposed in the lower base portion 16 beneath an upper extent of the sidewalls and perimeter region thereof. In an exemplary embodiment, the grill surface 26 can include ridged portions 26a thereon, however in other embodiments, the grill surface 26 can be planer without any ridges. The grill surface 26 can be made from food safe materials used in combination with high heat, such as cast iron, steel, enamel-coated metal, or other materials known in the art. A lower heating element 28, shown in FIG. 1D, can be disposed beneath the grill surface 26 and it can configured to heat the grill surface 26 in order to facilitate conductive cooking operations therewith.

Figure 1F:
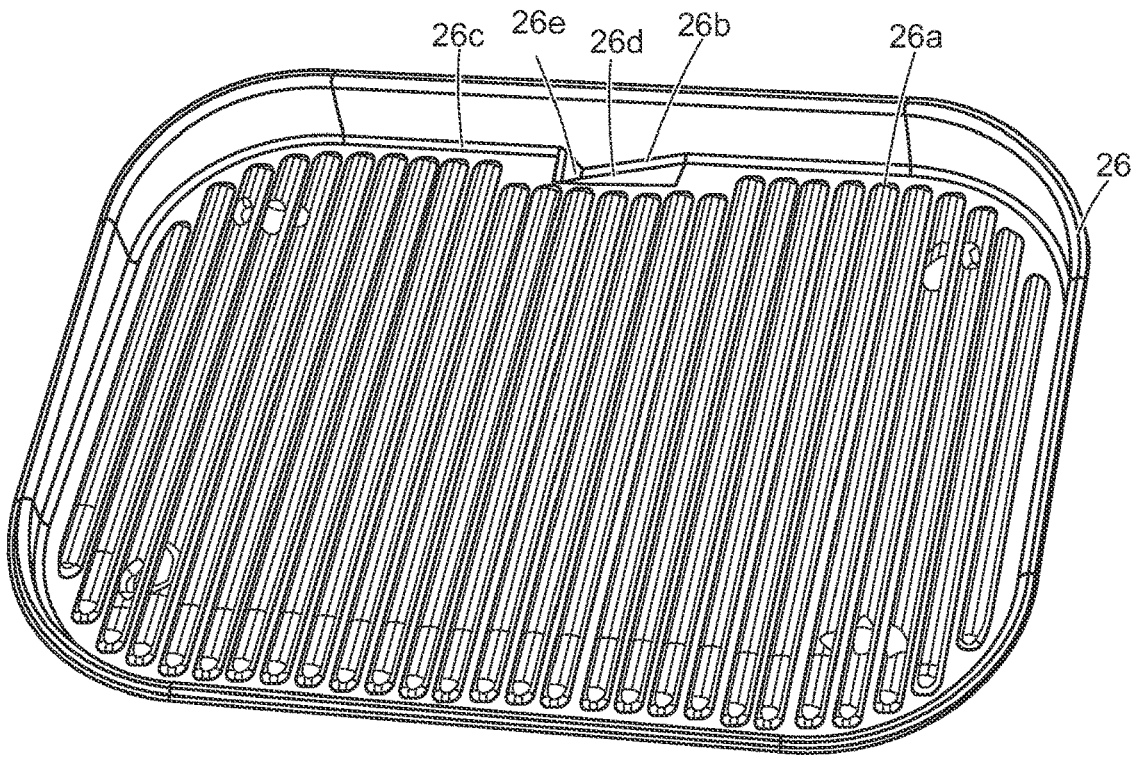
FIG. 1F is a front perspective view of a grill surface of the cooking system of FIG. 1A.
Figure 1G:
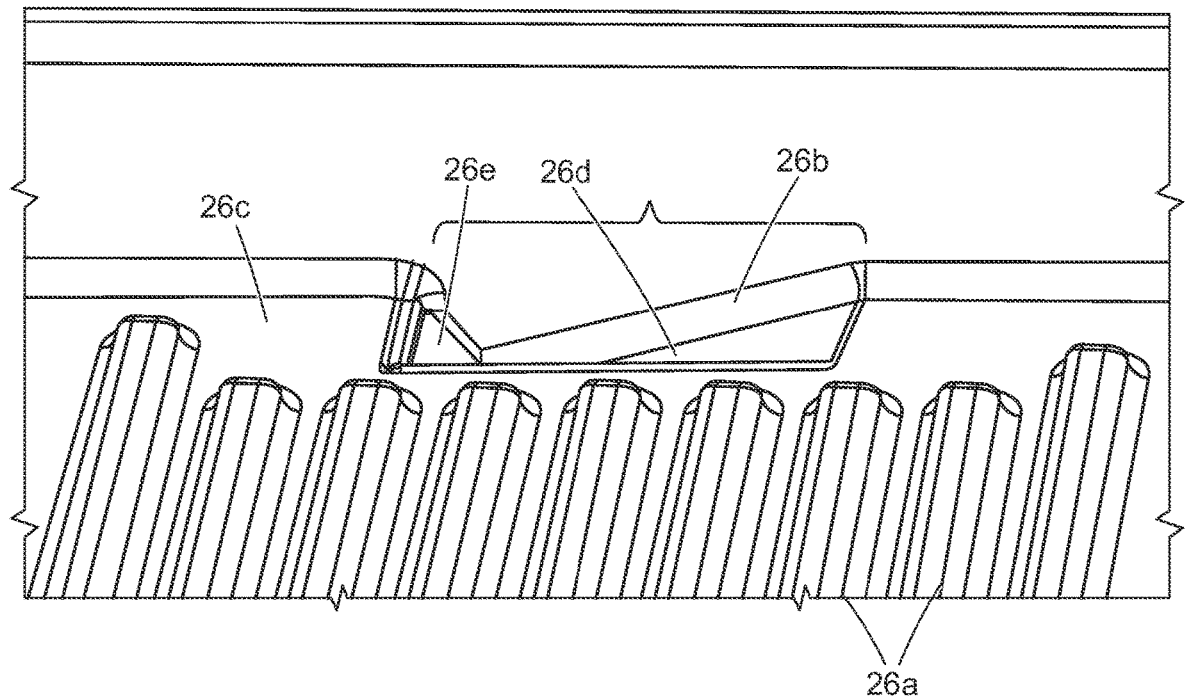
FIG. 1G is a front view of a grease drain of the cooking system of FIG. 1A.

As further shown in FIGS. 1F-1G, the grill surface 26 can include a grease drain 26b positioned to allow for drainage of excess grease, fat, and other liquids and waste created during various cooking operations. The grease drain 26b can be positioned at various locations, but in the illustrated embodiment it is formed in a bottom surface of the grill surface 26 and is positioned at a mid-portion of a rear wall thereof, as shown. A channel 26c formed around an exterior of the grill surface 26 can aid in directing grease toward the grease drain 26a, and may be angled downward to provide a gravity-assisted flow toward the grease drain 26a. The grease drain 26b can be sized to minimize excess airflow therethrough, and in this way can facilitate substantial sealing of the hollow cooking chamber 14 when the upper lid portion 18 is in the closed position. In the illustrated embodiment, as best shown in FIG. 1G, the grease drain 26b includes a ramped surface 26d extending downward from the grill surface 26 to an opening 26e formed at the end thereof. During a cooking process, as excess grease exits through the grease drain 26b, it can be collected in a container or reservoir 22, shown in FIG. 1C, to aid in disposal and cleaning. The reservoir 22 can in the form of a pan or tray, or in other forms, and can be removably attached to the lower base portion 16 in order to further aid in disposal.

Figure 1H:
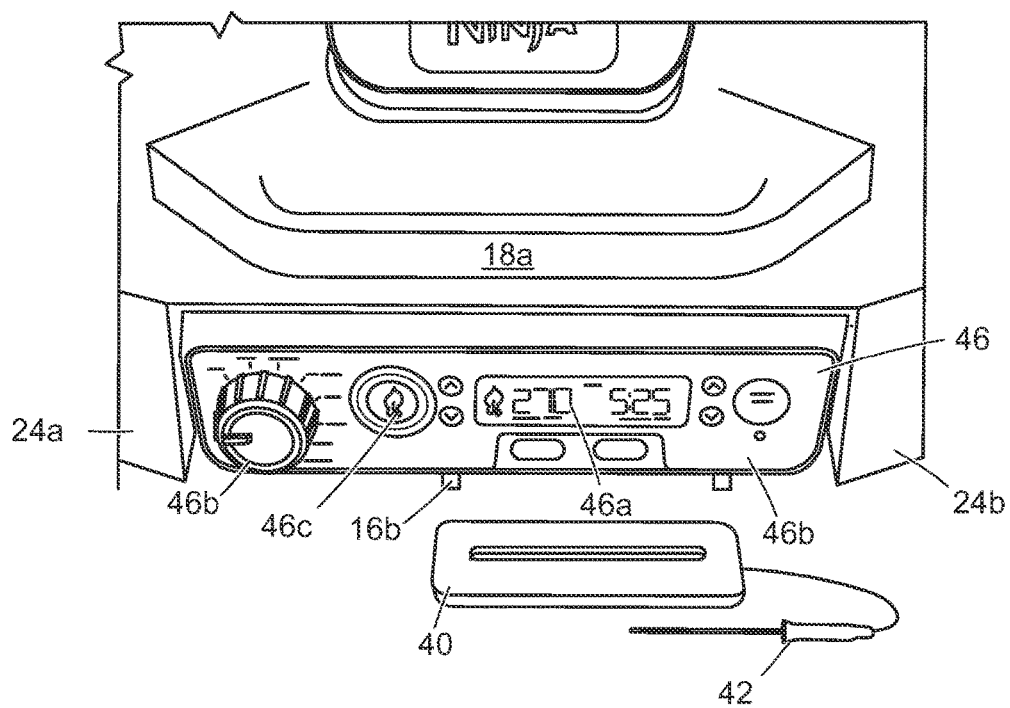
FIG. 1H is a front view of a user interface of the cooking system of FIG. 1A.

As shown in FIG. 1H, the lower base portion 16 can also include a probe holder 40 and probe 42 that can be removably mounted onto the housing. For example, the probe holder 40 with the probe 42 mounted therein can be sized to be received within a probe slot 16b, which is depicted in the form of a pair of arms that can retain the probe holder 40 therein. The probe 42 can be a temperature probe capable of interfacing with the cooking assembly 10 via a data port (not shown). While interfacing with the data port, the probe can be inserted into a food product to monitor a temperature thereof during a cooking process.

As further shown in FIGS. 1A-1D, the upper lid portion 18 can also include various features and elements. For example, as shown in FIGS. 1B and 1D, a fan 30 can be disposed on an upper interior surface of the upper lid portion 18, near a central region and within the hollow cooking chamber 14. The fan 30 can be configured to circulate air throughout the hollow cooking chamber 14 when in use. The fan 30 can circulate air in a variety of patterns, such as, for example, in a toroidal pattern, wherein air flows upward in the center region of the hollow cooking chamber 14 and then once it reaches the bottom of the cooking chamber 14, it can flow outward and downward in a second, opposite direction at the periphery of the hollow cooking chamber 14. The fan 30 can be electrically coupled to a motor (not shown) contained within a motor housing 32, and the motor housing 32 can centrally disposed on top of the upper lid portion 18. The motor housing 32 can include an additional fan 34 for cooling the motor, as well as vents 36 for providing air flow to the motor housing 32. Additional seal members (not shown) can be placed in the upper portion of the lid around electrical and mechanical fan components passing therethrough in order to contribute to further sealing of the hollow cooking chamber 14.

As further shown in FIG. 1B, the upper lid portion 18 can include an upper heating element 38 disposed on an interior thereof. In the illustrated embodiment, the upper heating element 38 is disposed above the fan 30. The upper heating element 38 can be configured to operate in conjunction with the fan 30, such that the air circulated by the fan 30 in the hollow cooking chamber 14 is heated by the upper heating element 38, such that convection cooking operations can be performed by the cooking assembly 10. The upper lid portion can include a lid aperture 42 on an upper interior thereof that is configured to allow air to flow through the upper lid portion and into the hollow cooking chamber. A person skilled in the art will appreciate that the cooking system can include any number of fans and/or heating elements positioned at various locations.

As shown further in FIGS. 1B-1D, the upper lid portion 18 can include an exhaust port 18c located on a rear side thereof. The exhaust port 18c can be sized to allow for substantially the same rate of airflow to exit the hollow cooking chamber 14 as is entering the hollow cooking chamber 14 through a lid aperture 18d, which will be discussed in more detail below.

FIGS. 1A-1D further depict an exemplary embodiment of a smoke assembly 50 coupled to the upper lid portion 18 of the housing 12 on an external surface thereof. The smoke assembly 50, while shown in the exemplary embodiment to be disposed external to the hollow cooking chamber 14, is in fluid communication with the hollow cooking chamber 14 via a lid aperture 18d such that smoke generated by the smoke assembly 50 can flow into the hollow cooking chamber 14 to be used during cooking operations to impart flavor onto food products. Various embodiments of the smoke assembly 50 will be discussed in greater detail below with respect to FIGS. 2A-9C.

As further shown in FIGS. 1A-1B, 1E, and 1H, the lower base portion 16 can include a user interface 46 arranged thereon. In the illustrated embodiment, the user interface 46 includes a display 46a configured to depict information about the cooking assembly 10, as well as various inputs 46b in the form of buttons and dials. These inputs 46b can set and adjust cooking operations of the cooking assembly 10, and can involve altering any of the features of the assembly 10, including the upper and lower heating elements 38, 28, the fan 30, and the smoke assembly 50.

When actuated, a controller (not shown) coupled to the user interface 46 is configured to run one or more software programs installed in the cooking system 10. These software programs may be directed to preset cooking operations, a plurality of operations executed in combination, and/or interruption programs which adjust in-progress operations with inputs received to modify the operation, such as from a user via the user interface 46, or from an external source. The cooking operations to be executed in combination can be executed simultaneously and/or in succession. The user interface 46, controller, cooking operations, and other functions will be discussed in greater detail below with respect to FIGS. 10-11.

With reference now to FIGS. 2A-2F, an exemplary embodiment of a smoke assembly 50 is shown. Generally, the smoke assembly 50 is configured to generate smoke for use in a cooking operation. The smoke assembly 50 can be mounted to an exterior surface of the upper lid portion 18 and is configured to be in fluid communication with the hollow cooking chamber 14 via a lid aperture 18d. The smoke assembly 50 can include a smoke assembly housing 52 having a generally rectangular configuration with top and bottom surfaces 52a, 52b, and four sides—narrower left and right sides 52c, 52d, and wider front and rear sides 52e, 52f—that together form an interior cavity 54. As shown in FIGS. 2A-2F, the front side 52e, proximate the housing 12, is formed to fit a contour of the outer surface of the upper lid portion 18, and therefore may be shorter than the rear side 52f. The rear side 52f, opposite the front side 52e, may include a first air intake 56a disposed at a lower region to allow air into the interior cavity 54. The top surface includes a lid 58 hinged to the smoke housing 52 that leads to the interior cavity 54. In some embodiments, the lid 58 is biased to a closed position via a spring 58a with enough force to prevent accidental opening, or to prevent excess air from seeping into the interior cavity 54. The interior cavity 54 is sized to receive an insertable removable fuel box assembly 60 therein. In some embodiments, the force exerted by spring 58a is large enough to prevent the fuel box assembly 60 from sliding out of the smoke assembly housing 52 when the upper lid portion 18 is in an open position.

The fuel box assembly 60 can be configured to receive and retain fuel for use during a cooking operation, and the fuel box assembly 60 can also catch and hold ash generated by combustion of the fuel. The fuel box assembly 60, seen within the smoke assembly housing 52 in FIG. 2C and removed from the smoke assembly housing 52 in FIG. 2F, includes left and right sidewalls 60a, 60b, and front and rear sidewalls 60c, 60d, which are wider than the left and right sidewalls 60a, 60b similar to the smoke assembly housing 52. The fuel box assembly 60 also includes a top surface 60e and a bottom surface 60f which extend between the sidewalls 60a-d at respective top and bottom ends. The particular shape and arrangement of the fuel box assembly 60 can vary in dimension, and certain features can be rounded or generally altered from what is depicted. The front sidewall 60c, disposed proximate the housing 52, is shown covered by a mesh 64 with a plurality of small apertures 62a disposed thereon. At an upper region of the front sidewall, beyond the mesh, the smoke assembly further includes a large aperture 62b. The particular amount and arrangement of apertures 62a, 62b can vary in number, arrangement, and/or dimension. The rear sidewall of the fuel box assembly 60 is substantially solid, except for at a lower region, which can contain a second air intake 56b that aligns with the first air intake 56a located on the rear sidewall of the smoke assembly housing 52. The first and second air intakes 56a, 56b define a portion of an airflow path through the cooking system 10.

The fuel box assembly 60 is further configured to be placed within the smoke assembly housing 52 to substantially conform with the left, right, and rear sides. A region near the front side of the smoke assembly housing 52 proximate the upper lid portion can be larger than a region occupied by the fuel box assembly 60, and is thus not filled by the fuel box assembly 60 when the fuel box assembly 60 is inserted into the smoke assembly housing 52. As shown in FIGS. 2A-2F, this region can contain an igniter 66, such as a wire heating element, that is configured to heat fuel contained in the fuel box assembly 60 through the smaller apertures 62a of the mesh 64 on the front fuel box assembly sidewall 60e. In various embodiments, the igniter 66 can take on various forms, such as, for example, a electrical tubular heating element or a sparking device. When smoke generation is required for a cooking operation, the igniter 66 can be powered on to ignite fuel contained in the fuel box assembly 60.

As further shown in FIGS. 2A-2F, the fuel box assembly 60 has an interior space. This interior space is divided into two regions, an upper region in the form of a pellet box 68 that is configured to receive and hold fuel for use during a smoke generation process, and a lower region in the form of an ash catcher 70 that is configured to receive and store ash created during a smoke generation process. The pellet box 68 and the ash catcher 70 are shown in the illustrated embodiment as being separated by a mesh divider 72. The mesh divider 72 includes apertures which are sized to be large enough to allow for ash to fall from the pellet box 68 to the ash catcher 70 during a smoke generation process, while also being small enough to prevent fuel from passing through the mesh divider 72. The ash catcher 70 is further configured to retain ash generated by the fuel box assembly 60, such that removal of the fuel box assembly 60 from the smoke assembly housing 52 will also remove ash from the smoke assembly housing 52 to facilitate disposal and prevent ash spillage. A person skilled in the art will appreciate that other techniques can be used to separate ash from the fuel.

In some embodiments, and as depicted in the FIGS. 2A-2F, the smoke assembly 50 can include a temperature sensor 74 disposed proximate to the fuel box assembly 60. The temperature sensor 74 can take on any suitable form, and, for example, may be one of a thermocouple, a resistance temperature detector (RTD), a thermistor, and a semiconductor based integrated circuit. However, any form of sensor capable of measuring temperature can be used. The temperature sensor 74 is configured to measure a temperature of the interior of the fuel box assembly 60 during smoke processes and non-smoke processes.

Figure 2A:
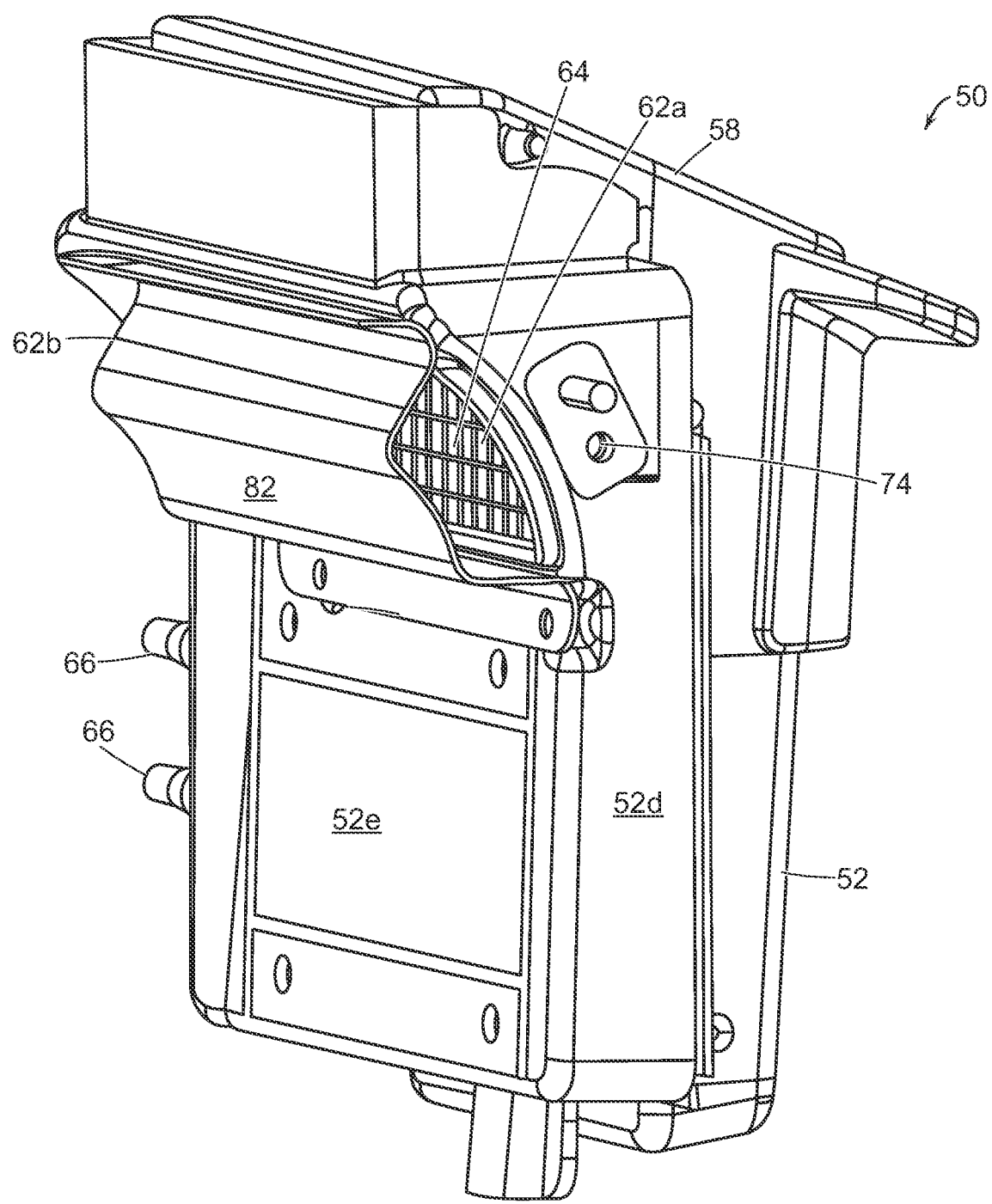
FIG. 2A is a side perspective view of the smoke assembly of FIG. 1A.
Figure 2B:
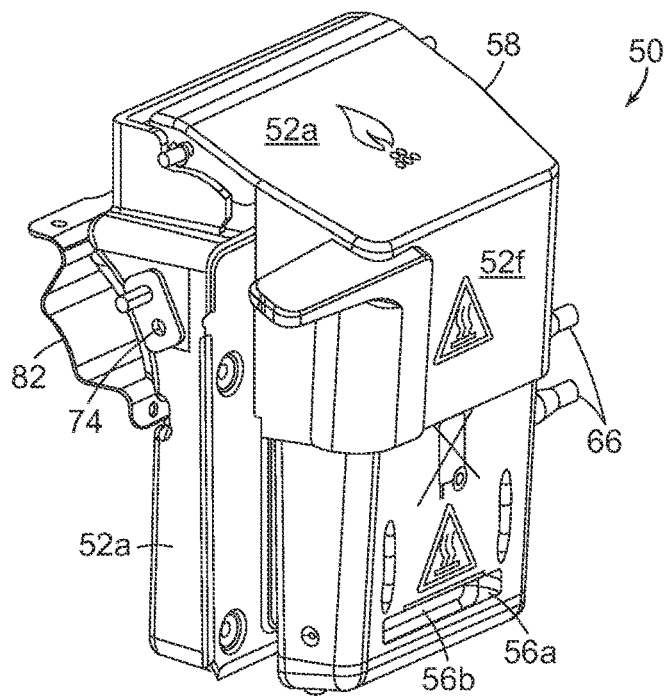
FIG. 2B is a rear perspective view of the smoke assembly of FIG. 2A.
Figure 2C:
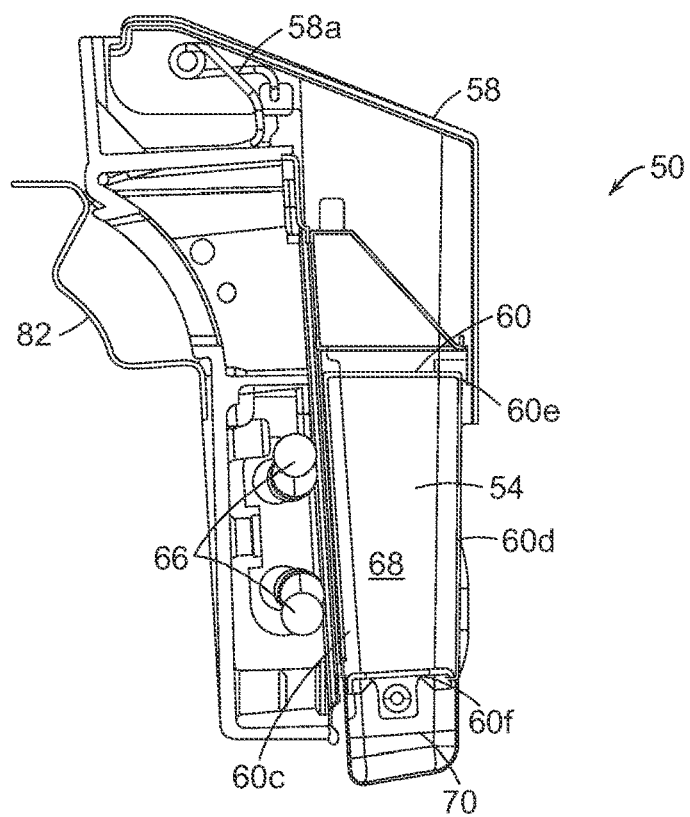
FIG. 2C is a side cross-sectional view of the smoke assembly of FIG. 2A.
Figure 2D:
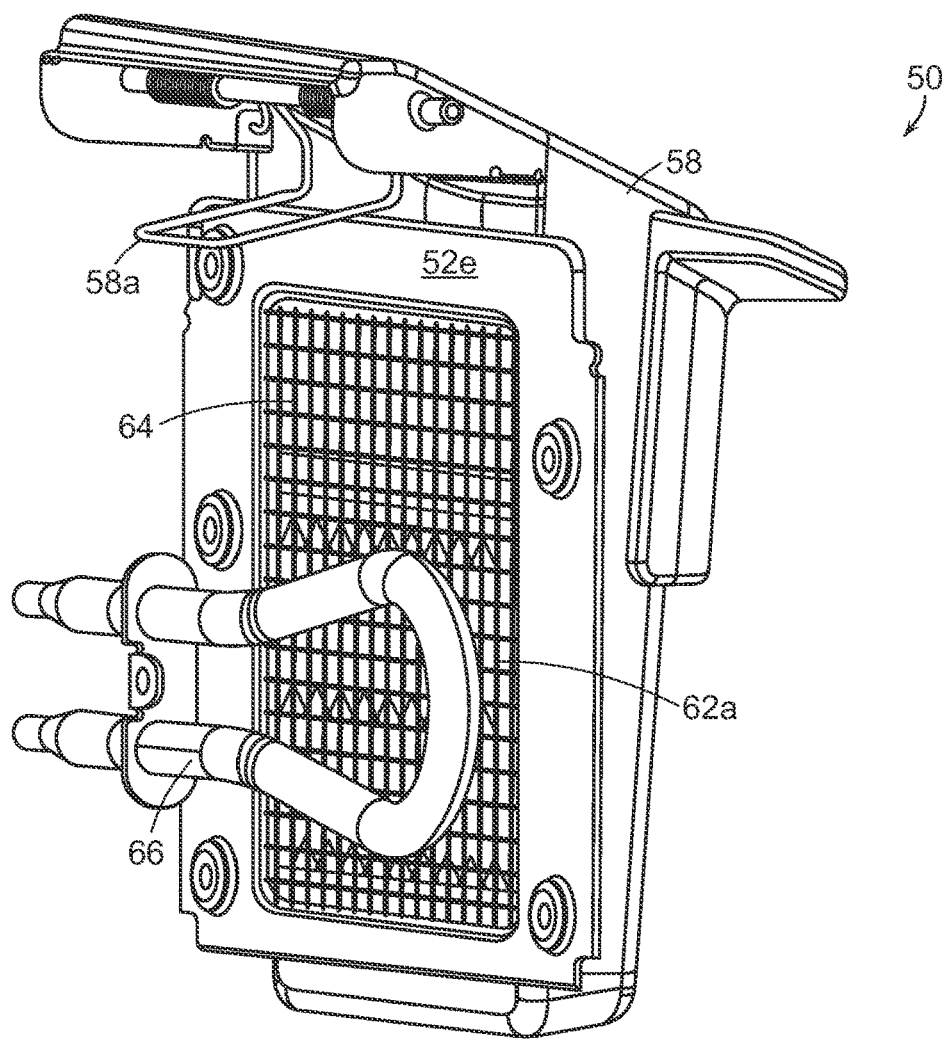
FIG. 2D is a partial cross-sectional view of the smoke assembly of FIG. 2A.
Figure 2E:
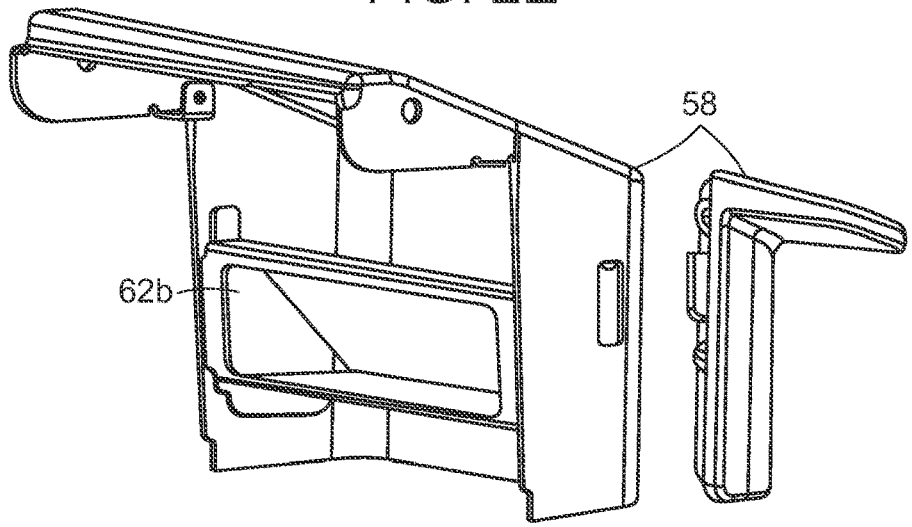
FIG. 2E is a side perspective view of a lid of the smoke assembly of FIG. 2A.
Figure 2F:
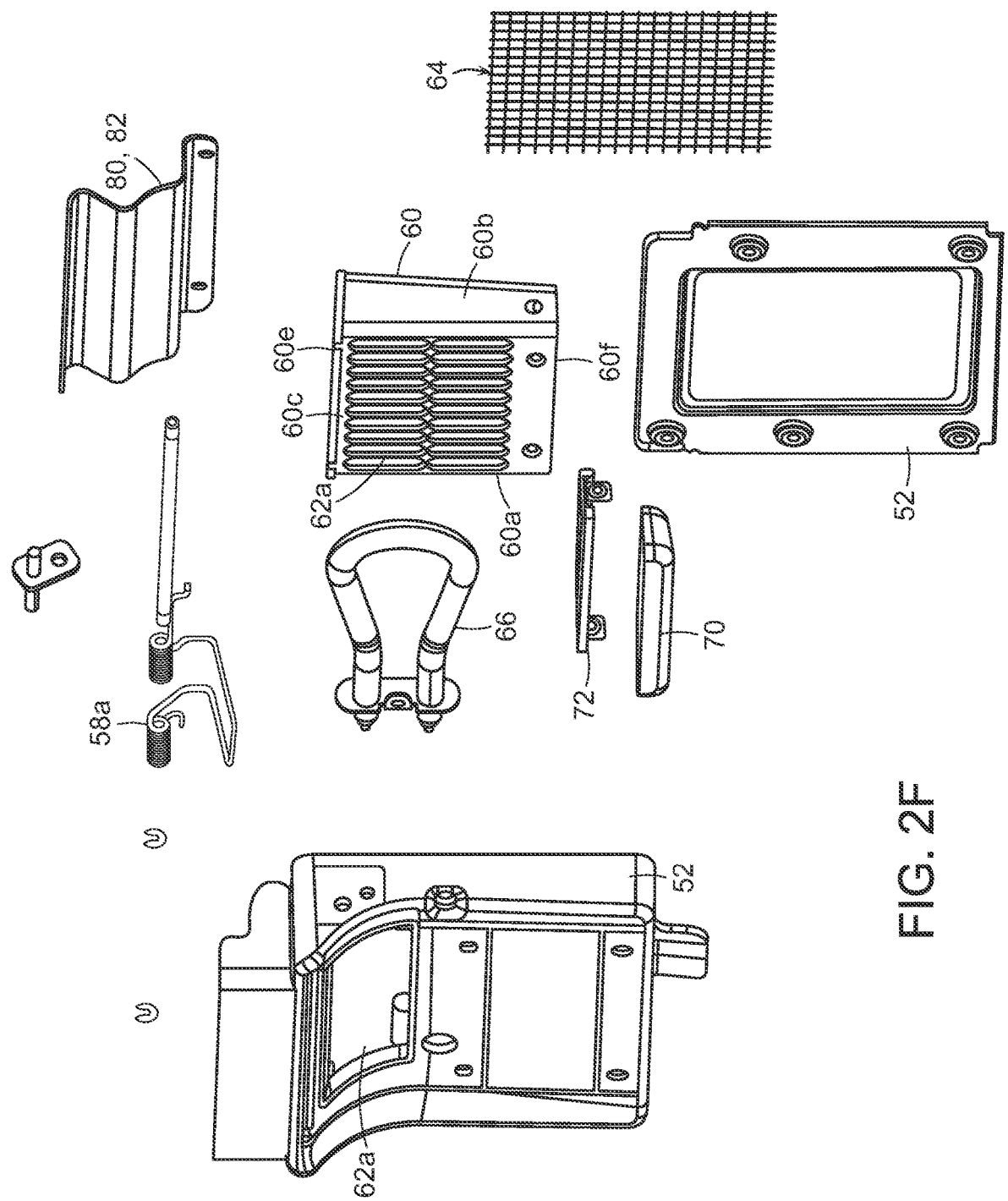
FIG. 2F is an exploded view of the smoke assembly of FIG. 2A.

The smoke assembly interior 54, including the interior of both the smoke assembly housing 52 and the fuel box assembly 60, are in fluid communication with the hollow cooking chamber 14. As mentioned previously, and as shown especially in FIG. 2C, the front sidewall of the smoke assembly 50, above the region containing the igniter 66, contains a large aperture 62b. The large aperture 62b defines part of the airflow pathway, joining the smoke assembly 50 interior with the hollow cooking chamber 14. Covering the large aperture 62b, as depicted in FIGS. 2A-2C, is a baffle 80 disposed in the airflow path. When the smoke assembly 50 is coupled to the housing 10 at the lid aperture 18d, the baffle 80 passes through the lid aperture 18d and is thereby positioned within the hollow cooking chamber 14.

In the embodiment shown in FIGS. 2A-2E, the baffle 80 is a tunnel baffle 82. The tunnel baffle 82 can include a cover 82c spanning the large aperture 62b that is oriented horizontally to align with a direction of airflow in the hollow cooking chamber 14. The cover 82c can include openings at each end thereof such that, in relation to airflow through the hollow cooking chamber 14, one opening is an upstream opening 82a and the other opening is a downstream opening 82b.

Figure 3A:
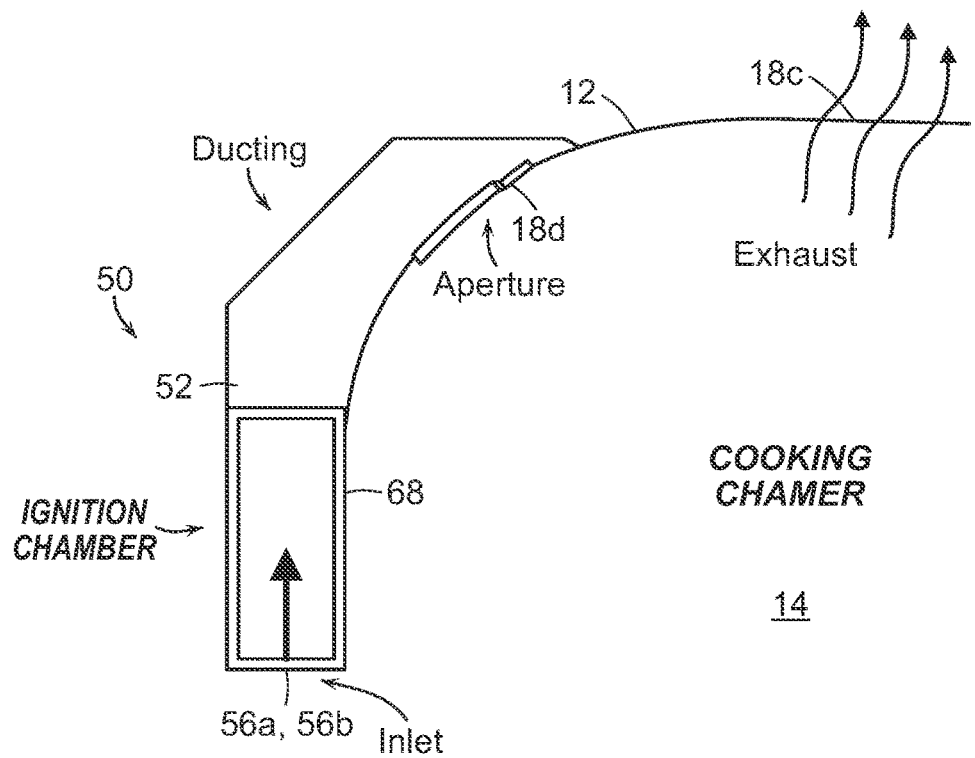
FIG. 3A is a diagram of an airflow path of the cooking system of FIG. 1A.
Figure 3B:
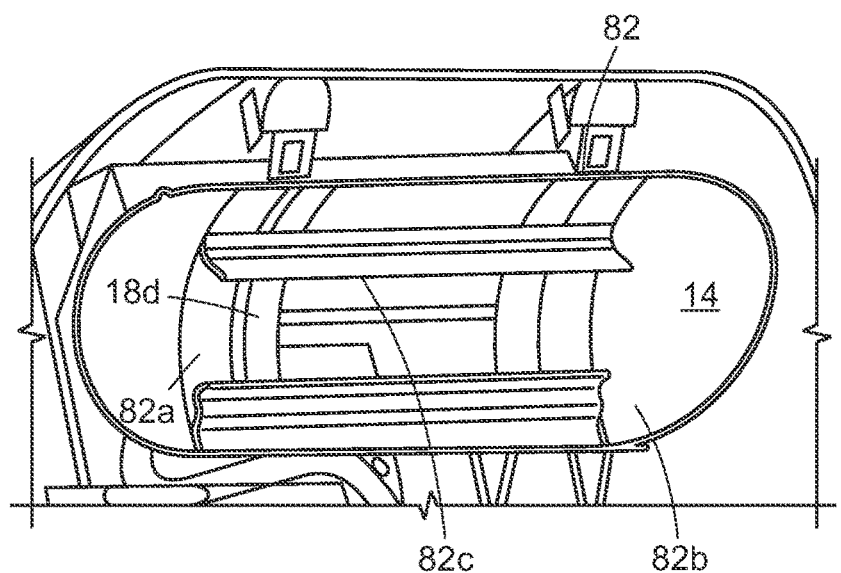
FIG. 3B is a partial cross-sectional view of an upper lid portion of the cooking system of FIG. 1A, including a partial cross-sectional view of a tunnel baffle, according to an embodiment.
Figure 3C:
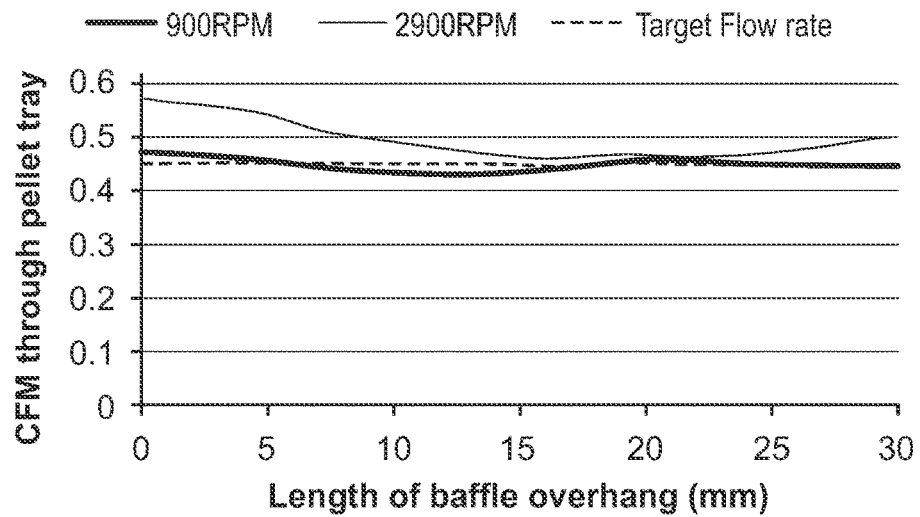
FIG. 3C is a graph of length of baffle overhang of the tunnel baffle of FIG. 3B versus rate of airflow through a smoke assembly at different fan speeds.
Figure 3D:
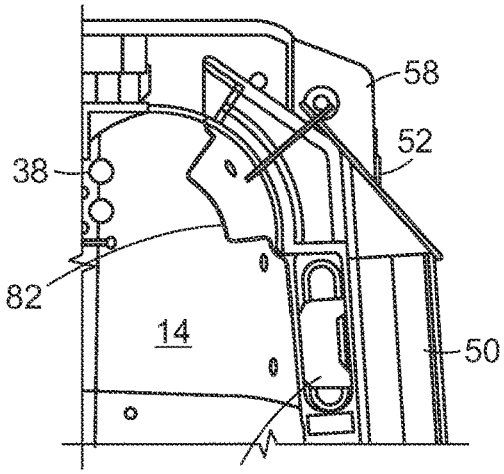
FIG. 3D is a partial cross-sectional view of an upper lid portion of the cooking system of FIG. 1A, including a right side view of a tunnel baffle, according to an embodiment.
Figure 3E:
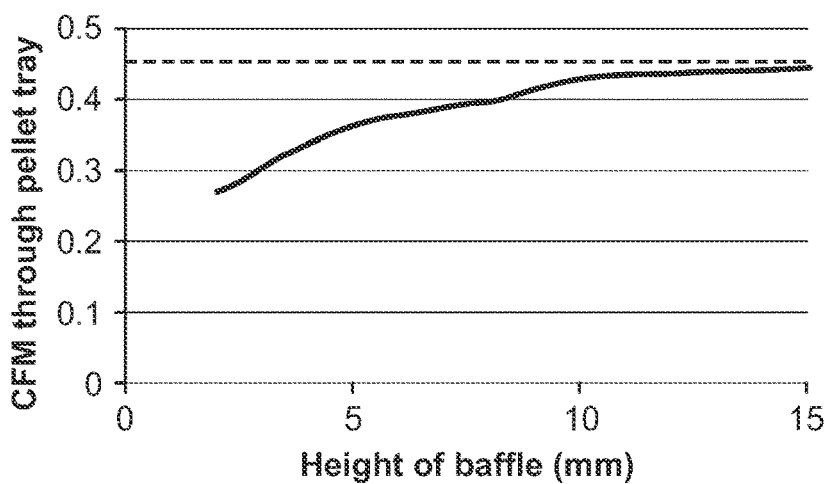
FIG. 3E is a graph of height of the tunnel baffle of FIG. 3D versus rate of airflow through a smoke assembly at different fan speeds.

Referring now to FIGS. 3A-3E, a simplified depiction of an airflow path through a cooking assembly is shown, along with graphs displaying a relationship between baffle dimension and airflow rates. The graph shown in FIG. 3C relates to length of baffle overhang versus airflow through the baffle, and the graph shown in FIG. 3E depicts a relationship between height of a baffle versus airflow through the baffle. These graphs will be described in greater detail, below.

In use, the tunnel baffle 82 can be configured to allow air to enter the upstream opening 82a, flow through the cover and over the large aperture 62b, and exit through the downstream opening 82b, thereby drawing air from the smoke assembly 50 through the lid aperture 18d and into the hollow cooking chamber 14. FIG. 3A is simplified cross-sectional view of an airflow path, including an intake, such as intakes 56a, 56b, disposed at a bottom of a smoke assembly (e.g., smoke assembly 50). FIG. 3A further includes an aperture region, including large aperture 62b leading to the hollow cooking chamber 14 through which a baffle (e.g., tunnel baffle 82) would be disposed. An exhaust port 18c is also depicted, which allows for airflow to exit the hollow cooking chamber 14. In particular, such as in the embodiment described above, the housing 12 and the smoke assembly 50 together define an airflow pathway configured to provide smoke generated by the smoke assembly 50 to the hollow cooking chamber 14 during a cooking operation. The flow of air through the smoke assembly 50 and into the hollow cooking chamber 14 can be enabled by a fan (e.g., fan 30) disposed in the upper lid portion 18. In an exemplary embodiment, air is introduced to the pathway through the first and second air intakes 56a, 56b contained in both the smoke assembly housing 52 and the fuel box assembly 60, respectively, at the rear side of the smoke assembly 50. After entering through the first and second intakes 56a, 56b, the airflow will then enter the interior of the fuel box assembly 60. If fuel in the pellet box 68 is being burned, the airflow will pick up generated smoke. If fuel in the pellet box 68 is not being burned then there will be no smoke entering the hollow cooking chamber. In either scenario, the airflow will continue from the pellet box 68 into the hollow cooking chamber 14 via the baffle 80, drawn therein by the fan 30. In the exemplary embodiment, the direction of airflow through the smoke assembly 50—from the bottom to the top—aligns with the direction of the natural convection current of combusting fuel. Once the airflow enters the hollow cooking chamber 14, it can be circulated by the fan 30. Eventually, the airflow will exit the hollow cooking chamber 14 through the rear exhaust port 18c, which is sized appropriately to enable effective airflow. The rate of airflow entering the hollow cooking chamber 14 via the baffle 80 will be substantially equal to the rate of airflow exiting the hollow cooking chamber 14 via the exhaust port 18c.

In some embodiments, to enable consistent airflow through the airflow path, the air intakes 56a, 56b are sized to be smaller than the exhaust 18c. Additionally, the lid aperture 18d can be sized to be larger than both the air intakes 56a, 56b and the exhaust port 18c. For example, in one embodiment, the air intakes 56a, 56b each are approximately 2 $cm^2$ in size, the exhaust port 18c is approximately 3 $cm^2$ in size, and the lid aperture 18d is approximately 20 $cm^2$ in size.

This airflow can be affected by a number of factors, including dimensions and arrangement of the baffle 80. In the exemplary embodiment of the smoke assembly 50, as depicted in FIGS. 2A-2F, the baffle 80 is in the form of a tunnel baffle 82 having a substantially trapezoidal cross-section. FIGS. 3C and 3E depict graphics showing a relationship between baffle dimensions and airflow, for example FIG. 3C depicts adjustments of a length of baffle overhang as it affects a rate of airflow through a pellet box at two different fan speeds, 900 RPM and 2900 RPM, while FIG. 3E depicts adjustments of a baffle height as it affects a rate of airflow through a pellet box. In FIG. 3C, it can be seen that as the length of baffle overhang increases at the 2900 RPM fan speed, airflow approaches the target rate, before diverging at approximately 25 mm of baffle overhang. At the 900 RPM fan speed, baffle overhang has minimal impact on airflow rate. In FIG. 3E, as baffle height increases, so too does airflow through the baffle, approaching a near constant rate at approximately a 15 mm baffle height.

Referring now to FIGS. 4A-6, depicted are alternative baffle types and a diagram depicting baffle position as it affects a rate of airflow through a pellet box.

Figure 4A:
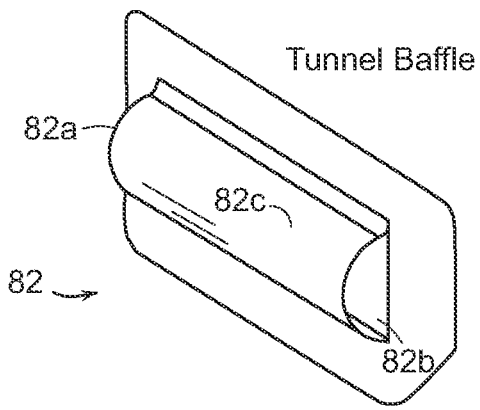
FIG. 4A is a front perspective view of a tunnel baffle.
Figure 4B:
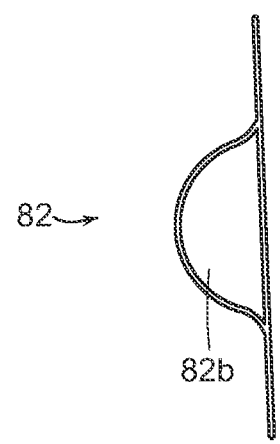
FIG. 4B is a right side view of the tunnel baffle of FIG. 4B.
Figure 4C:
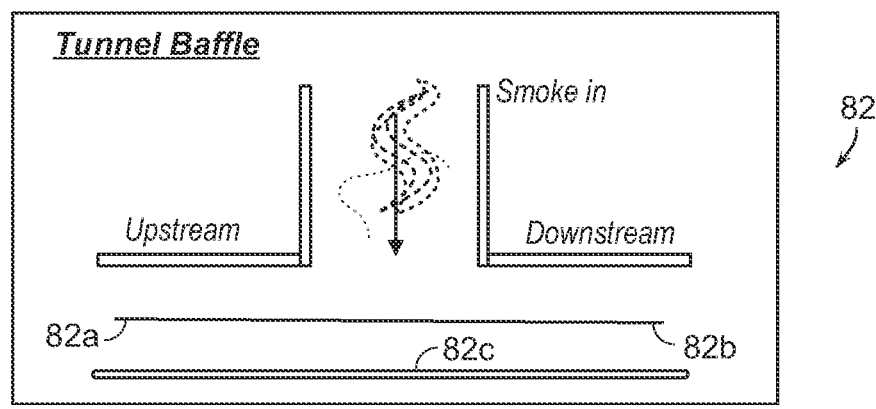
FIG. 4C is an airflow diagram of a tunnel baffle.

FIGS. 4A and 4B depict an alternative embodiment of a tunnel baffle 82' having a hemispherical profile. Similar to the baffle 82, depicted in the exemplary embodiment of FIGS. 2A-2E, the tunnel baffle 82' covers a lid aperture 18d and includes an upstream opening 82a' and a downstream opening 82b to allow airflow through the tunnel baffle 80'. FIG. 4C depicts a simplified view of a tunnel baffle 80 and its various openings 82a, 82b, as well as a path of airflow with smoke entering the hollow cooking chamber 14 from a smoke assembly (e.g., smoke assembly 50).

Figure 5A:
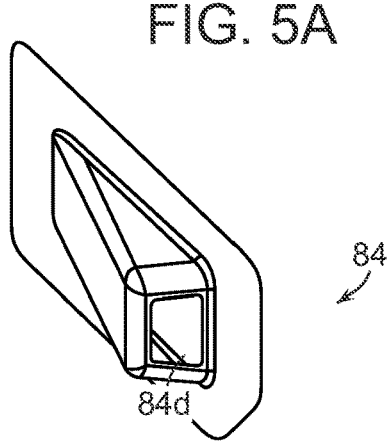
FIG. 5A is a front perspective view of a Venturi baffle.
Figure 5B:
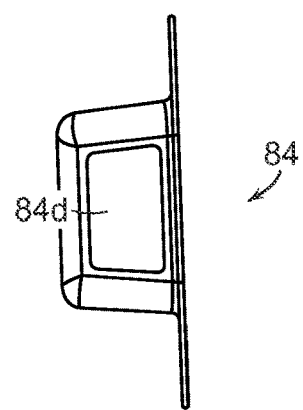
FIG. 5B is a right side view of the Venturi baffle of FIG. 5A.

In some embodiments, the baffle 80 can be in the form of a Venturi baffle 84, such as the kind depicted in FIGS. 5A and 5B. The Venturi baffle 84 can be used in conjunction with any smoke assembly embodiment described herein. For illustrative purposes, description is provided with respect to smoke assembly 50. The Venturi baffle 84 is shown mounted to an exterior of the smoke assembly housing 52 over the large aperture 56b, similar to tunnel baffle 82 described above. The Venturi baffle 84 can have top and bottom triangular sidewalls 84a, 84b, and rectangular wall 84c connecting the two side walls 84a, 84b to form a ramped housing. The hypotenuse edge of the triangular sidewalls 84a, 84b can be mounted to the inner surface of the upper lid portion 18, and the three sidewalls 84a, 84b, 84c together can define a baffle opening 84d at the end thereof that defines part of the airflow path.

Figure 5C:
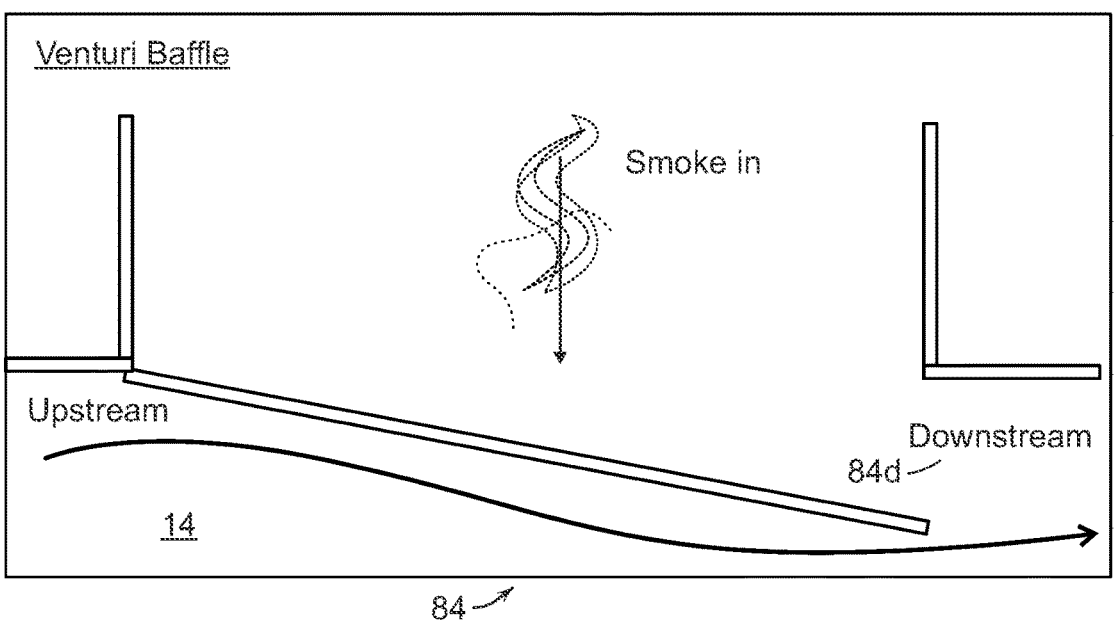
FIG. 5C is an airflow diagram of a Venturi baffle.

The Venturi baffle 84 and fan 30 are configured to work in tandem, such that the baffle opening 84d is directed toward a leading direction of the fan 30 orientation in a downstream flow path. For example, if the fan 30 is configured to rotate in a clockwise orientation, the baffle opening 84d can be directed such that airflow will be emitted from the baffle opening 84d in the clockwise orientation. Conversely, if the fan 30 is configured to rotate in a counter-clockwise orientation, then the baffle opening 84d can be configured to emit airflow in the counter-clockwise orientation. As the fan 30 rotates and air is circulated in the hollow cooking chamber 14, the Venturi baffle 84 is configured to take advantage of the Venturi effect and allow for air to be drawn therethrough from the smoke assembly 50, through the lid aperture 42, and into the hollow cooking chamber 14. FIG. 5C depicts a simplified view of the Venturi baffle 84 in relation to the airflow path. As shown in FIG. 5C, due to the triangular shape of the Venturi baffle 84, upstream airflow in the hollow cooking chamber 14 will be forced to flow around the contour of the Venturi baffle 84, and therefore smoke from a smoke assembly (e.g., smoke assembly 50) will be drawn into the hollow cooking chamber 14 by a fan (e.g., fan 30) via the Venturi effect.

Figure 6:
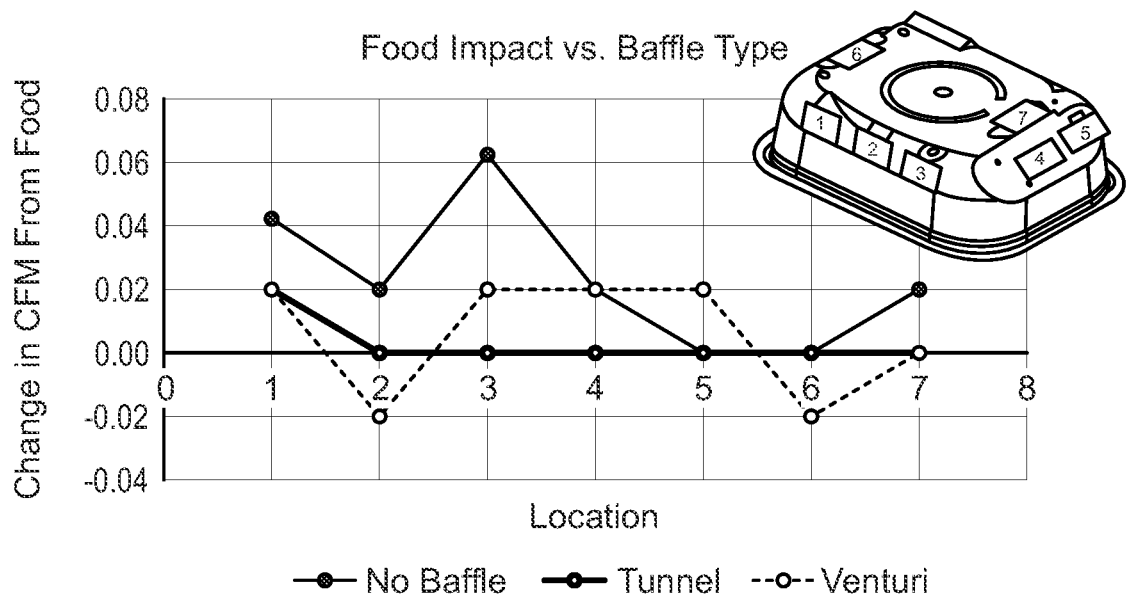
FIG. 6 is a graph of change in airflow through an airflow path based on baffle type and location on an upper lid portion of the cooking assembly of FIG. 1A.

The presence of a large food product within the hollow cooking chamber 14 can affect airflow therethrough during cooking operations. FIG. 6 shows a change in airflow to the hollow cooking chamber 14 versus baffle placement for both the tunnel baffle 82 and the Venturi baffle 84. The change in airflow is measured between two scenarios, a first scenario in which the hollow cooking chamber 14 includes a large food product, and a second scenario in which the hollow cooking chamber 14 does not include any food product. In each of these placements, a corresponding smoke assembly (e.g., smoke assembly 50) would remain in fluid communication therethrough to facilitate smoke operations. As the baffle type changes between a tunnel baffle and a Venturi baffle, or no baffle at all, airflow therethrough will also change. Additionally, the tunnel baffle, Venturi baffle, and no baffle will also have altered airflow rates depending upon their position on the housing, depicted in the insert of FIG. 6 at numbers 1-7.

FIGS. 7-9C illustrate additional embodiments of a smoke assembly similar to the smoke assembly 50 described above. Accordingly, like components are not described in detail. The embodiments featured are functional with the cooking system 10 depicted in FIGS. 1A-1H, as well as any other embodiments contemplated herein.

Figure 7:
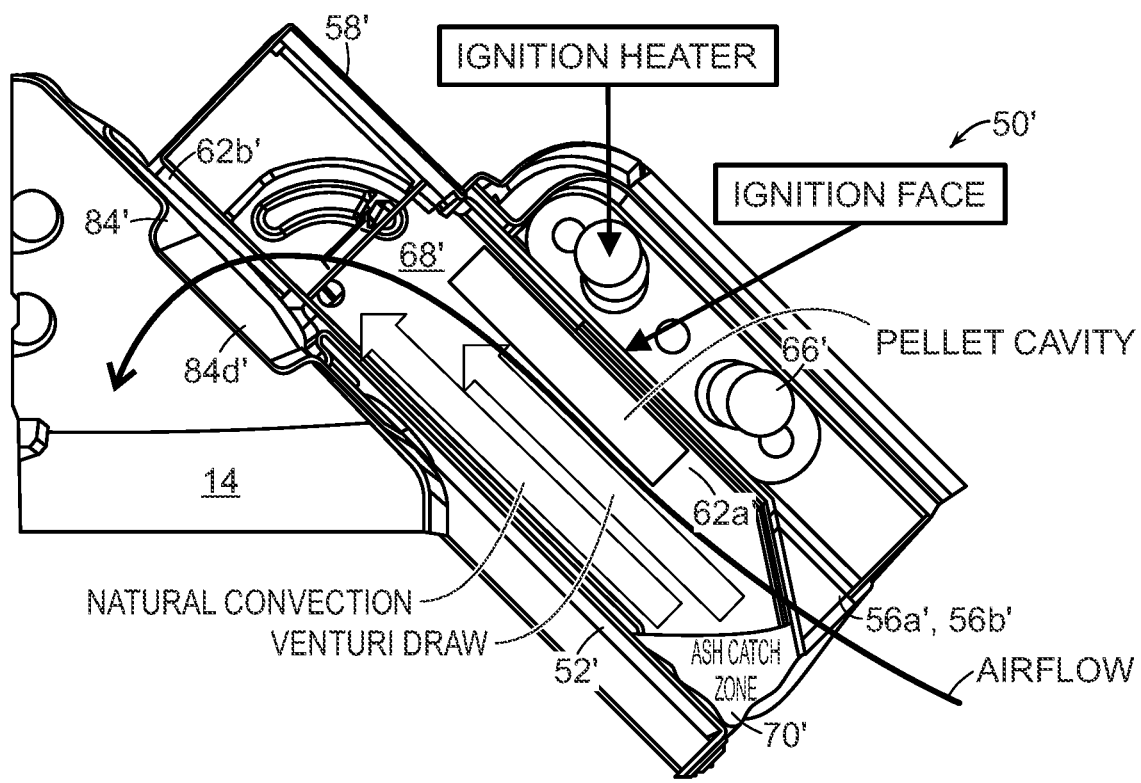
FIG. 7 is a side cross-sectional view of another embodiment of a smoke assembly of a cooking system, having a downward-angle orientation.
Figure 8:
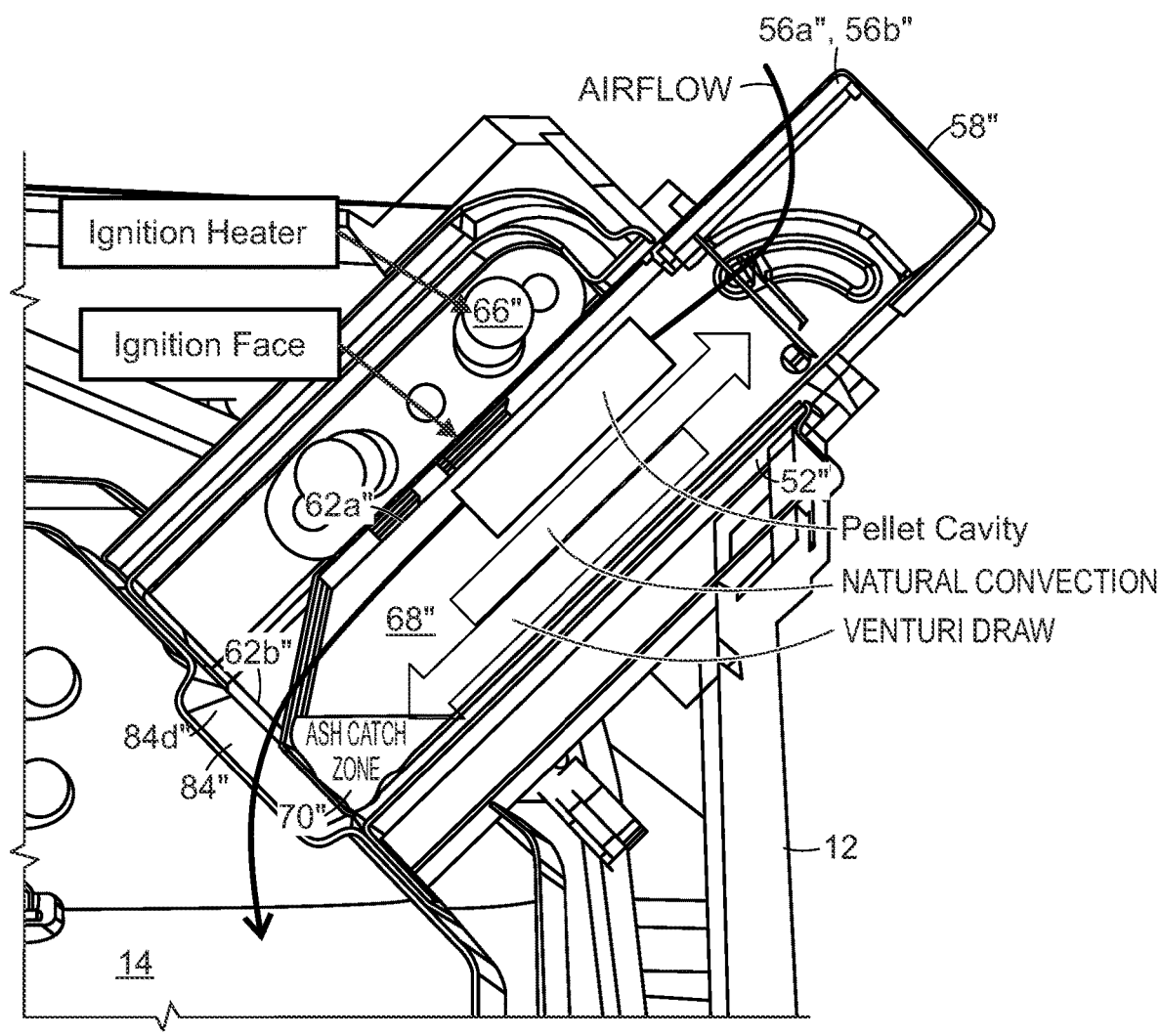
FIG. 8 is a side cross-sectional view of another embodiment of a smoke assembly of a cooking system, having an upward-angle orientation.

FIGS. 7-8 depict two embodiments of a smoke assembly 50', 50" where the smoke assembly 50', 50" is arranged in an alternative orientation relative to the housing. In the embodiment shown in FIG. 7, the smoke assembly 50' is arranged in a substantially downward orientation at an approximately 45-degree angle relative to a side of the upper lid portion 18. In the embodiment shown in FIG. 8, the smoke assembly 50" is arranged in a substantially upward orientation at an approximately 45-degree angle relative to the side of the upper lid portion 18, and is offset from the orientation of the embodiment shown in FIG. 7 by approximately 90-degrees. The smoke assemblies 50', 50" of FIGS. 7-8 include a smoke assembly housing 52', 52" and a fuel box assembly 60', 60" configured to be removably inserted into the smoke assembly housing 52', 52". The smoke assembly housing 52', 52" has a bottom surface 52a', 52a", a top surface 52b', 52b", and left 52c', 52c'", right 52d', 52d'", front 52e', 52e", and rear sides 52f, 52f'. The fuel box assembly 60', 60" is divided into a pellet box 68', 68" and an ash catcher 70', 70" disposed in the pellet box 68', 68". As shown in FIGS. 7-8, the ash catcher 70', 70" occupies a lower region of the fuel box assembly 60', 60". The smoke assembly 50', 50" further includes an igniter 66', 66" disposed within the smoke assembly housing 52', 52" and positioned proximate to a sidewall of the fuel box assembly 60', 60" containing a plurality of apertures 62a', 62a", and the igniter 66, 66" is configured to ignite fuel contained within the pellet box 68', 68". The smoke assembly 50', 50" defines part of an airflow path. The rear side 52f', 52f" of the smoke assembly housing 52', 52" and the rear side 68f', 68f'' of the fuel box assembly 60', 60" each contain respective first 56a', 56a" and second 56b', 56b" air intakes that are aligned and configured to receive airflow therethrough and allow the airflow to enter the smoke assembly housing 52', 52" and the fuel box assembly 60', 60".

In both the embodiment of FIG. 7 and the embodiment of FIG. 8, the igniter 66', 66" is disposed above the smoke assembly 50', 50" and is configured to ignite fuel contained in the pellet box 68', 68" in a top-down manner. The fuel disposed closer to the igniter 66', 66" will combust first, continuing in a downward fashion to then combust fuel disposed further from the igniter 66', 66". As the fuel combusts, the natural convection current created will cause smoke to travel from the combusting fuel in an upward direction. In the embodiment shown in FIG. 7, this upward direction leads toward a baffle (e.g., Venturi baffle 84) to then enter the hollow cooking chamber 14. In the embodiment shown in FIG. 8, this upward direction leads away from the Venturi baffle 84 toward the first 56a', 56a" and second intakes 56b', 56b". In each embodiment, if the fan 30 is in operation while the fuel is combusting, the Venturi effect will also operate to draw smoke from the combusting fuel through the Venturi baffle 84 and into the hollow chamber 14. In the embodiment shown in FIG. 7, this direction of Venturi draw is upward, and therefore the natural convection current and the Venturi flow are in substantial alignment. In the embodiment shown in FIG. 8, this direction of Venturi draw is downward, and therefore the natural convection current and the Venturi flow are misaligned.

Figure 9A:
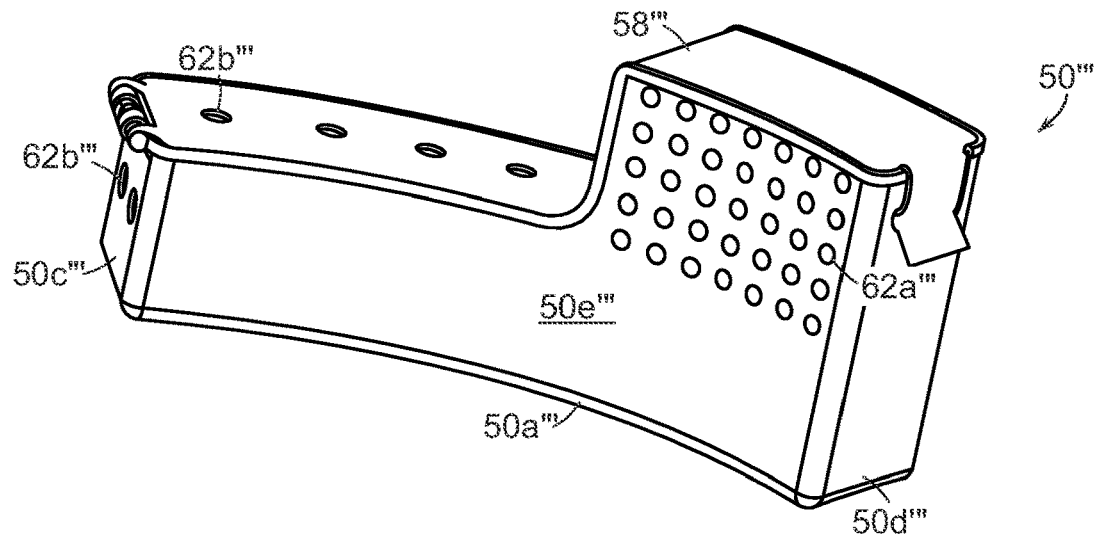
FIG. 9A is a perspective view of another embodiment of a smoke assembly of a cooking system, mountable in an interior of the cooking system.
Figure 9B:
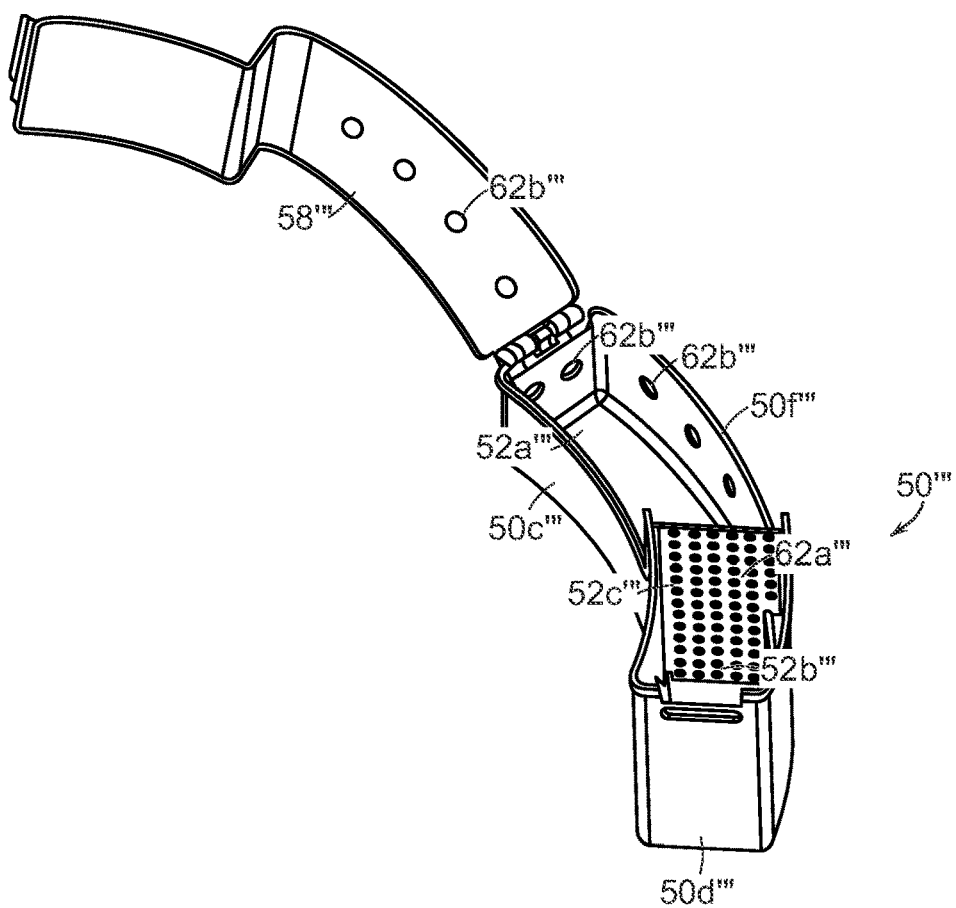
FIG. 9B is a perspective view of the embodiment of the smoke assembly of FIG. 9A, having a lid in an open position.
Figure 9C:
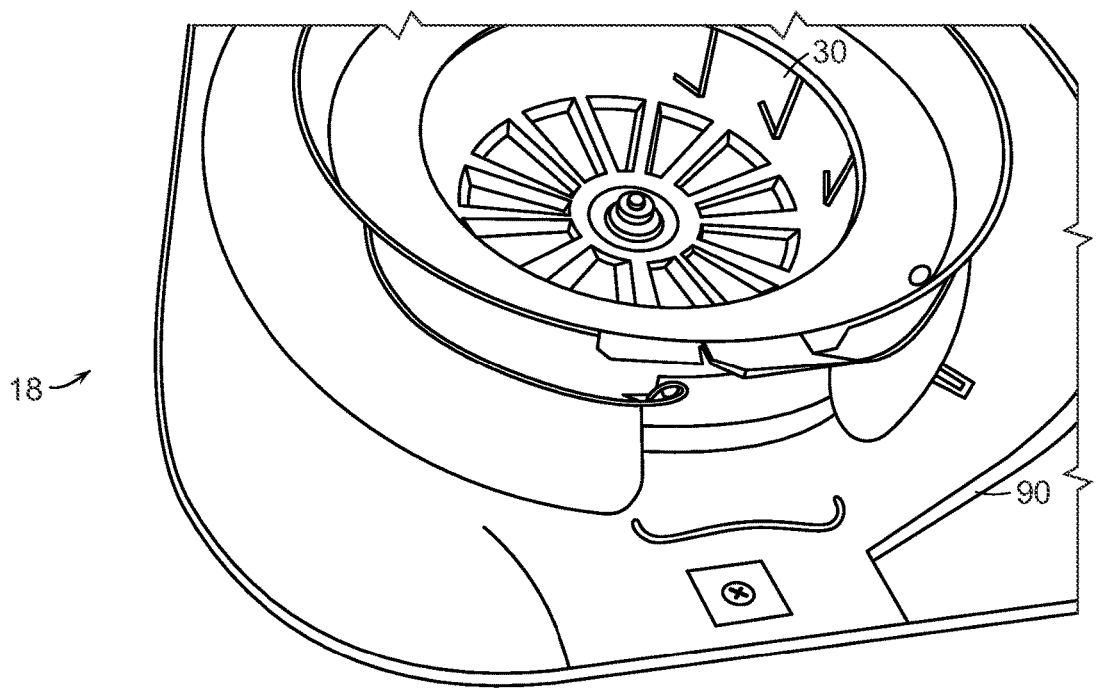
FIG. 9C is a partial view of an upper lid assembly having a mount for the smoke assembly of FIGS. 9A and 9B.

FIGS. 9A-9C depict another embodiment of a smoke assembly 50'''. The smoke assembly 50''' is generally L-shaped and is curved so as to be configured to extend at least partially circumferentially around a fan 30 and upper heating element 38 within a hollow cooking chamber 14. The smoke assembly 50''' includes an arc-shaped base 50a''' having left 50c''', right 50d''', interior-facing 50e''', and exterior facing sides 50f''', with the interior-facing direction being a radially-inward direction and the exterior-facing direction being a radially-outward direction. The left side 50c''' extends upwardly from the base 50a''' to a first height, and the right side 50d''' extends upwardly from the base 50a''' to a second, higher height. The interior-facing 50e''' and exterior facing 50f''' sides each have a left portion extending upwardly to the first height and a right portion extending upwardly to the second height, such that both of the interior-facing 50e''' and exterior facing 50f''' sides have a substantially L-shaped façade. The smoke assembly 50''' also includes a stepped lid 58''' hinged to the left side 50c''', and the stepped lid 58''' is formed such that in a closed position, a left portion of the stepped lid 58''' is at the first height and a right portion of the lid 58''' is at the second height, and there is a vertically-oriented section of lid 58''' extending between the left and right portions. In this orientation, the lid 58''' can close the smoke assembly 50''', despite the height differential between the left and right portions. The smoke assembly 50''' further has an interior divided into first 52a''' and second 52b''' compartments, with a center divider 52c''' extending between the two compartments. The first compartment 52a''' is defined by the region having the first height, and the second compartment 52b''' is defined by the region having the second height. Moreover, the right side and the upper portion of the interior-facing side 50e''', as well as the center divider 52c''', all include a first plurality of apertures 62a''' thereon, which densely occupy each surface. The right side 50d''', exterior-facing side 50f''', and lid 58''', each have a second plurality of apertures 62b''' thereon, but which are less densely occupying each surface.

The smoke assembly 50''' is configured to be received within a slot 90 within the hollow cooking chamber 14, such that the smoke assembly 50''' is proximate the fan 30 and upper heating element 38. As shown in FIG. 9C, a slot 90 or cavity can be formed within the upper lid portion 18 to receive and retain the smoke assembly 50''' during a cooking operation. When received within the upper lid portion 18, the upper heating element 38 is configured to ignite fuel contained within the smoke assembly 50''' through the apertures 62a''' located on the interior-facing sidewall, and smoke can be generated directly within the hollow cooking chamber 14 without the need for an air flow path to include components outside of the hollow cooking chamber 14.

Figure 10:
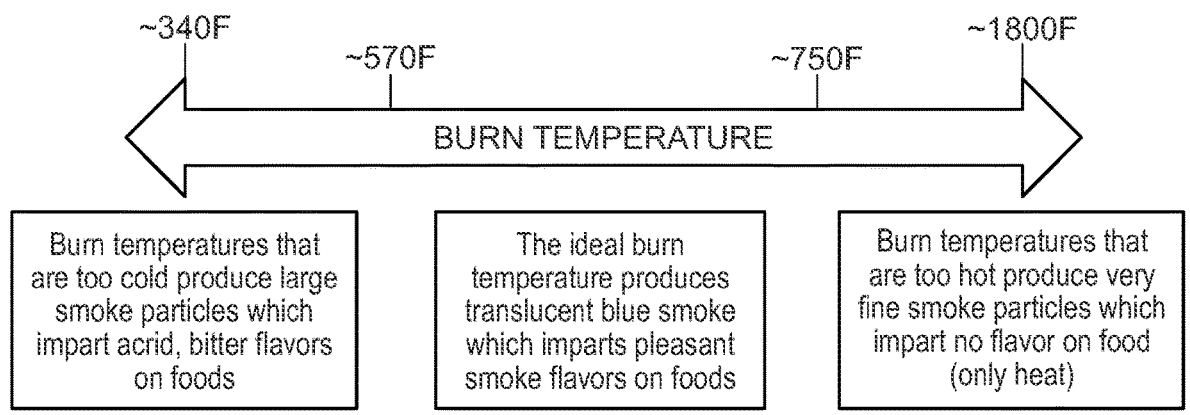
FIG. 10 is a graph showing burn temperatures and smoke types.
Figure 11:
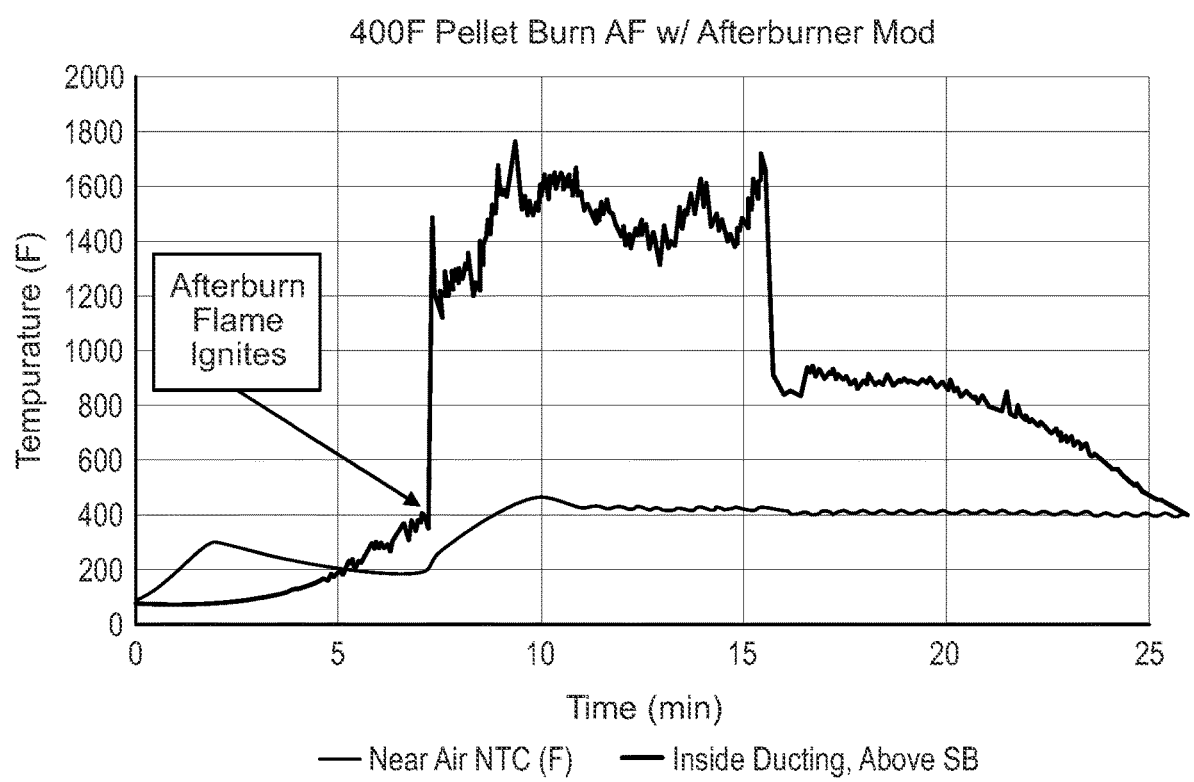
FIG. 11 is a graph showing afterburn temperatures measured inside a smoke assembly and a hollow cooking chamber.

Referring now to FIGS. 10-11, informational graphics are depicted related to the function of any of the cooking assembly embodiments discussed previously. For discussion purposes, the following description of functions and operations will be presented with respect to the exemplary embodiments of the housing 12 and smoke assembly 50 depicted in FIGS. 1A-2F.

As mentioned above, the cooking assembly 10 is operated by a user interface 46 located on an exterior of the front side of the housing 12. The user interface 46 is coupled to a controller that coordinates operation of the various components of the cooking assembly 10 based on instructions received at the user interface 46, as well as based on inputs measured by various sensors within the cooking system. These cooking operations include conductive, convective, and radiative heating methods, such as grilling, baking, air frying, dehydrating, and other known cooking methods. Further, these cooking operations include methods relying on smoke generated by the smoke assembly 50. Smoke methods can include low-and-slow, perfume smoke, and variable fan speed. Any of the listed operations can be used in combination with one another, both in succession or at the same time.

In an exemplary embodiment, such as shown in FIGS. 1A, 1B, and 1F, the user interface 46 includes a smoke infusion input 46c, which can cause the smoke assembly 50 to generate smoke on-demand. The smoke infusion input 46c can be used with any other cooking operation as a means by which additional smoke flavor can be imparted onto a food product as desired. If smoke functionality is not already in use, actuation of the smoke infusion input 46c can cause the igniter 66 to ignite fuel stored in the pellet box 68. If smoke functionality is already in use, actuation of the smoke infusion input 46c can cause the fan 30 to draw more smoke into the hollow cooking chamber 14. In other embodiments, actuation of the smoke infusion input 46c can result in various changes to the cooking assembly 10 based on detected stimuli during a cooking operation, which result in the generation of more smoke for imparting cooking flavor onto a food product. For example, if a detected temperature in the smoke assembly 50 is low, indicating a weak ember, actuation of the smoke infusion input 46c may cause the fan 30 to increase a fan speed, thereby pulling more air through the airflow path to grow the ember and generate additional smoke. In these embodiments, the generation of smoke is the outcome, however the system can determine how to go about generating more smoke based on detected stimuli.

During cooking operations in which smoke is generated and imparted as flavor onto a food product, various factors can affect the amount and quality of smoke generated, as well as the amount and quality of flavor imparted. These factors include fuel type and amount, airflow amount, temperature, and more.

FIG. 10 depicts a graphical representation of a relationship between burn temperature and type of smoke produced. At lower burn temperatures, for example, below approximately 570 degrees Fahrenheit, smoke may contain larger particles which can import acrid, bitter flavors onto food products. Conversely, at higher burn temperatures, for example, above approximately 750 degrees Fahrenheit, smoke may contain smaller particles which impart little to no flavor onto food products. Burn temperatures between these two bounds, i.e., between approximately 570 degrees Fahrenheit and below 750 degrees Fahrenheit, produce what is commonly known as "blue" smoke, which imparts pleasant smoke flavors onto food products. Therefore, in certain embodiments, it is desirable to maintain a burn temperature within this "blue" smoke range while smoke is generated. This maintenance can be accomplished through the control and adjustment of the listed factors, above.

The embodiments described herein can be used with a variety of fuel types, such as wood pellets, wood chips, herbs, and other kinds known in the art. Certain fuel types will produce smoke at different rates, and consistency across fuel types can vary wildly. Moreover, the amount of fuel contained in the pellet box can greatly impact the volume of smoke generated over a smoke duration. In some embodiments, the smoke assembly 50 can be refilled during a smoke generation process in order to generate more smoke. However, in other embodiments, less smoke may be desired in order to impart less smoke flavor onto a food product. In these embodiments, the smoke assembly 50 can be filled part way with fuel, or it can be filled with a fuel which generates less smoke, or which burns faster.

Beyond fuel considerations are airflow considerations, increasing the amount of airflow through the airflow path can feed a combustion process, such that fuel is burned at a higher rate when a higher airflow is present. Alternatively, if smoke generation is desired for a longer timeframe, then slowing the combustion process may be required. In either case, the amount of airflow being fed into the smoke assembly 50 can be determined by the operation speed of the fan 30. Because the fan 30 is drawing airflow through the airflow path, higher fan speeds will pull more oxygen into the smoke assembly and increase the combustion rate of fuel, while lower fan speeds will pull less oxygen and decrease the combustion rate.

The cooking assembly 10 can operate in a low-and-slow cooking mode in which smoke is generated by the smoke assembly 50 and then circulated in the hollow cooking chamber 14 over the duration of the cooking operation. In an exemplary embodiment, the smoke assembly 50 is filled to a maximum level with fuel prior to commencement of a cooking process. The low-and-slow mode is selected at the user interface 46, which then powers on an igniter 66 to ignite the fuel. Once the fuel is ignited, the fan 30 is operated at a low speed to prolong smoke generation in order to maximize the amount of smoke flavor imparted onto a food product.

The cooking assembly 10 can operate in a perfume smoke mode in which smoke is generated by the smoke assembly 50 and then circulated in the hollow cooking chamber 14 just long enough to impart smoke flavor onto a food product. In some embodiments, the smoke assembly 50 is filled only partially with fuel. In embodiments which rely on a smoke assembly 50 which is disposed inside the hollow cooking chamber 14, only a first compartment of the smoke assembly will hold pellets. Operation in a perfume smoke mode generates a lower smoke volume and can be used in conjunction with other cooking modes to enhance the flavor of a food product without requiring extensive smoke generation.

The cooking assembly can operate in a variable fan speed mode in which the fan 30 is operated at varying speeds during the duration of a cooking process in order to alter the quality and quantity of smoke generated by a smoke assembly. Additionally, a variable fan speed mode can be used in combination with other smoke modes such as the low-and-slow mode or the perfume smoke mode discussed above. As discussed previously, during smoke procedures the igniter 66 ignites fuel stored in a smoke assembly 50. Once the fuel has ignited and an ember has been created, a temperature sensor 74 can monitor an internal temperature of the smoke assembly to gauge the size and temperature of the ember, and therefore the rate at which fuel is being consumed. In order to increase the ember temperature, the fan 30 can increase a fan speed to pull more air through the airflow path. This increased airflow will feed the ember and create a higher temperature inside the smoke assembly. This higher temperature, in turn, will alter the volume and type of smoke generated. If the temperature of the ember becomes too high, however, there may be a risk of "afterburn." Afterburn occurs when the ember is able to consume all of the supplied oxygen within the smoke assembly 50, and then the smoke itself can ignite, greatly increasing the smoke assembly 50 temperature and eliminating smoke flavors imparted onto food. Accordingly, in an exemplary embodiment, the temperature of the ember is monitored by a temperature sensor 74, and a fan speed is adjusted to maintain an ember of sufficient size and temperature to produce ideal smoke conditions, based on user commands, sensed data, or a combination thereof.

In some embodiments, while monitoring an internal temperature of the smoke assembly, the temperature sensor 74 may detect that the internal temperature has fallen below a lower threshold, or that the temperature has changed too much in a given period of time. This lower threshold or change in temperature can be set to correspond to a weak ember or to an ember which has extinguished after ignition. When this occurs, the igniter 66 can be configured to attempt re-ignition of fuel in the smoke assembly to begin a new combustion process and/or to grow an existing ember. In embodiments where the igniter 66 creates a spark, the attempted re-ignition may involve sparking at regular or irregular intervals. In other embodiments where the igniter 66 is a heating wire, such as n electrical tubular heating element, the attempted re-ignition may involve powering on for a specific duration of time. These re-ignition attempts may continue for a specific duration or until the internal temperature rises to a certain level without the assistance of the igniter 66, thereby indicating that combustion of fuel has reached a satisfactory level for smoke generation. In some embodiments, if, after a certain number of re-ignition attempts, the system determines that re-ignition is unsuccessful, such as the internal temperature does not increase above the lower threshold, or the internal temperature does not increase at a certain rate, the system will cease re-ignition attempts. For example, this may occur if the fuel assembly no long has fuel, and therefore combustion is not possible with the smoke assembly 50.

In embodiments where the system attempts re-ignition, the system can display a message on the user interface 46 to provide a status of the attempted re-ignition in order to notify a user of the status. For example, if re-ignition is successful, a message indicating re-ignition can be displayed.

A graph of temperature versus time in the context of smoke assembly ignition and burn is depicted in FIG. 11. In this graph, there is a sharp vertical spike in temperature which coincides with afterburn taking place in a cooking assembly. This temperature falls well within the heightened temperature zone, i.e., above 750 degrees Fahrenheit, depicted in FIG. 10, and would therefore impart little to no flavor onto a food product. Moreover, the fuel inside the smoke assembly 50 could be consumed at a high and undesirable rate.

Certain exemplary implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A cooking assembly, comprising:
a housing having a base defining a hollow cooking chamber and a lid movably coupled to the base;
at least one heating element disposed in the housing and in thermal communication with the hollow cooking chamber;
a fan mounted to the housing and configured to circulate air in the hollow cooking chamber; and
a smoke unit mounted on the lid, the smoke unit including a fuel box in fluid communication with the hollow cooking chamber, and an igniter configured to ignite fuel contained in the fuel box, wherein the fan is configured to draw smoke from the fuel box into the hollow cooking chamber.

2. The cooking device of claim 1, further comprising a grill surface disposed in the housing, and the at least one heating element comprises a first heating element disposed above the grill surface and a second heating element disposed beneath the grill surface.

3. The cooking device of claim 1, further comprising a baffle disposed in the lid, the baffle being in fluid communication with the hollow cooking chamber and the fuel box and being configured to allow smoke to be drawn therethrough from the smoke unit into the hollow cooking chamber.

4. The cooking device of claim 3, further comprising an exhaust port on the housing, the exhaust port and the baffle being configured allow fluid flow therethrough at substantially the same flow rate.

5. The cooking device of claim 1, wherein the smoke unit includes an ash catcher disposed below the fuel box and configured to retain ash, the ash catcher being separated from the fuel box by a screen.

6. The cooking device of claim 1, wherein the smoke unit further includes a temperature sensor configured to measure an internal temperature of the fuel box.

7. The cooking device of claim 1, wherein the igniter is disposed above the fuel box and is configured to ignite fuel in a top-down manner.

8. The cooking assembly of claim 1, wherein the smoke unit is mounted to an exterior of the housing.

9. The cooking assembly of claim 1, wherein the smoke unit is mounted to an exterior of the cooking chamber.

10. The cooking assembly of claim 1, wherein at least one of the at least one heating element or the fan is mounted to the lid.

11. A cooking assembly, comprising:
a cooking device including a lid removably coupled to a base, the cooking device defining an internal cooking chamber having a cooking surface;
a heating element disposed in the cooking device adjacent the cooking surface such that the heating element is configured to heat the cooking surface for conductive cooking operations;
a smoke unit coupled to an exterior of the lid and fluidly coupled to the internal cooking chamber, the smoke unit including a fuel box containing at least one aperture, the smoke unit including an igniter disposed outside of the fuel box and proximate to the at least one aperture, the igniter being configured to ignite fuel source contained within the fuel box through the at least one aperture; and
a fan disposed in the cooking device and configured to draw smoke generated by the smoke unit into the internal cooking chamber.

12. The cooking assembly of claim 11, wherein the smoke unit includes a temperature sensor configured to measure an internal temperature of the fuel box.

13. The cooking assembly of claim 11, wherein the smoke unit includes an ash catcher disposed beneath the fuel box.

14. The cooking assembly of claim 11, wherein the smoke unit includes a lid coupled to the fuel box, the lid being biased to a closed position.

15. The cooking assembly of claim 11, wherein the smoke unit includes a housing fixed to the lid, and wherein the fuel box is removably insertable in the housing.

* * * * *